(12) United States Patent
Li et al.

(10) Patent No.: US 11,762,719 B2
(45) Date of Patent: Sep. 19, 2023

(54) DATA DISTRIBUTION SYSTEM AND DATA DISTRIBUTION METHOD

(71) Applicants: Beijing Zhongxiangying Technology Co., Ltd., Beijing (CN); BOE Technology Group Co., Ltd., Beijing (CN)

(72) Inventors: Peng Li, Beijing (CN); Dachuan Wang, Beijing (CN); Yuanyuan Lv, Beijing (CN); Yongliang Han, Beijing (CN); Guangyu Shao, Beijing (CN); Wenjuan Li, Beijing (CN); Hong Wang, Beijing (CN)

(73) Assignees: Beijing Zhongxiangying Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 115 days.

(21) Appl. No.: 17/429,912

(22) PCT Filed: Nov. 18, 2020

(86) PCT No.: PCT/CN2020/129891
§ 371 (c)(1),
(2) Date: Aug. 10, 2021

(87) PCT Pub. No.: WO2022/104611
PCT Pub. Date: May 27, 2022

(65) Prior Publication Data
US 2022/0350685 A1    Nov. 3, 2022

(51) Int. Cl.
*G06F 9/54*       (2006.01)
*G06F 16/25*      (2019.01)
*G06F 9/445*      (2018.01)

(52) U.S. Cl.
CPC .......... *G06F 9/546* (2013.01); *G06F 9/44505* (2013.01); *G06F 16/258* (2019.01)

(58) Field of Classification Search
CPC ...... G06F 9/546; G06F 9/4405; G06F 16/258; G06F 9/448
See application file for complete search history.

(56) References Cited

U.S. PATENT DOCUMENTS

| 2012/0191536 A1* | 7/2012 | Chen | G06Q 30/04 |
| | | | 705/30 |
| 2013/0204934 A1* | 8/2013 | Srivastava | G06F 9/542 |
| | | | 709/204 |

(Continued)

FOREIGN PATENT DOCUMENTS

| CN | 103166813 A | 6/2013 |
| CN | 108173874 A | 6/2018 |

(Continued)

OTHER PUBLICATIONS

CN2020800028602 first office action.

*Primary Examiner* — Tuan C Dao
(74) *Attorney, Agent, or Firm* — IPRO, PLLC

(57) ABSTRACT

The present disclosure relates a data distribution system and a data distribution method. The platform includes a channel configuration module and a data engine module, the channel configuration module is connected with an external device, and is configured to convert obtained device data of the external device into preset product model data and store the preset product model data into a second message queue; the data engine module is connected with the channel configuration module and is configured to distribute the preset product model data obtained from the second message queue. In this embodiment, data distribution can be achieved by uniformly analyzing the device data, such that the users of the data distribution system can directly use the device (Continued)

data, which is beneficial to improving the stability, compatibility and portability of the system.

13 Claims, 23 Drawing Sheets

(56) References Cited

U.S. PATENT DOCUMENTS

| | | | | |
|---|---|---|---|---|
| 2014/0059211 | A1* | 2/2014 | Alapati | G06F 11/3082 |
| | | | | 709/224 |
| 2015/0324202 | A1* | 11/2015 | Ma | G06F 9/30145 |
| | | | | 712/217 |
| 2016/0071054 | A1* | 3/2016 | Kakarala | G06Q 10/0875 |
| | | | | 705/28 |
| 2016/0088462 | A1* | 3/2016 | Jin | H04W 36/0061 |
| | | | | 455/456.5 |
| 2016/0151603 | A1* | 6/2016 | Shouldice | G16H 20/30 |
| | | | | 600/26 |
| 2016/0210578 | A1* | 7/2016 | Raleigh | G06Q 30/04 |
| 2017/0169339 | A1* | 6/2017 | Dalmia | G06N 5/047 |
| 2017/0371703 | A1* | 12/2017 | Wagner | G06F 9/485 |
| 2019/0196961 | A1* | 6/2019 | Li | G06F 12/0246 |
| 2020/0204460 | A1* | 6/2020 | Schneider | H04L 43/10 |
| 2021/0073052 | A1* | 3/2021 | Deluca | G06N 5/02 |

FOREIGN PATENT DOCUMENTS

| | | |
|---|---|---|
| CN | 108200190 A | 6/2018 |
| CN | 111083128 A | 4/2020 |
| CN | 111291103 A | 6/2020 |
| CN | 111294285 A | 6/2020 |
| CN | 111294401 A | 6/2020 |
| CN | 111953777 A | 11/2020 |
| WO | 2019243787 A1 | 12/2019 |

* cited by examiner

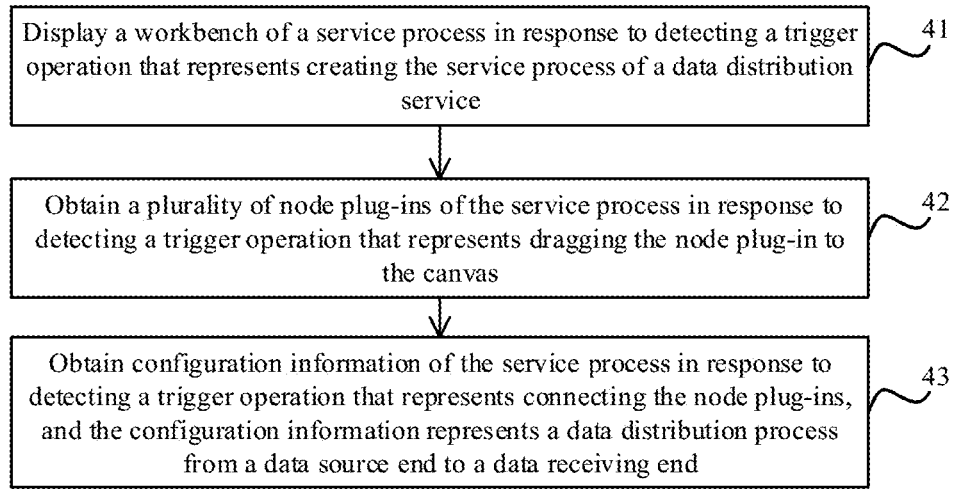

```
Display a workbench of a service process in response to detecting a trigger     41
operation that represents creating the service process of a data distribution
                                   service
                                      ↓
Obtain a plurality of node plug-ins of the service process in response to       42
detecting a trigger operation that represents dragging the node plug-in to
                                the canvas
                                      ↓
Obtain configuration information of the service process in response to
detecting a trigger operation that represents connecting the node plug-ins,    43
and the configuration information represents a data distribution process
          from a data source end to a data receiving end
```

FIG. 4

| Attribute name | Identifier | Data type | Optional item | Description |
|---|---|---|---|---|
| CardId | cardId | Character type(Text) | * Mandatory | |
| Direction | direction | Character type(Text) | * Mandatory | |
| GuardId | guardId | Integer type(int) | * Mandatory | |
| WorkId | workId | Integer type(int) | * Mandatory | |
| Record time | created | Character type(Text) | * Mandatory | |
| Pass result | result | Character type(Text) | * Mandatory | |

* Add a line

| | | | |
|---|---|---|---|
| Access control pass record data | Routing channel | | |

Process node name: Routing channel

Brief introduction: Please input a brief introduction

Select data source

Data source: Access control record-Actual data    /custom/guard/173

Data filtering

| Attribute name | Identifier | Data type | Optional item |
|---|---|---|---|
| CardId | cardId | Character type(Text) | * Mandatory |
| Direction | direction | Character type(Text) | * Mandatory |
| GuardId | guardId | Integer type(int) | * Mandatory |
| WorkId | workId | Integer type(int) | * Mandatory |
| Record time | created | Character type(Text) | * Mandatory |
| Pass result | result | Character type(Text) | * Mandatory |

FIG. 11

| Access control pass record data | MySQL Data table | | | |
|---|---|---|---|---|
| Basic Information | | | | |
| | Process node type: | MySQL Data table | | |
| | Process node name: | MySQL Data table | | |
| | Brief introduction: | Please input a brief introduction | | |
| Select data source | | | | |
| | Data source: | Please select an instance of the storage node | | |
| | Select data table: | Smart Park | | |
| | | Smart Park T | | |
| Data table structure | | Create – Forward-topic-wml | | |
| | | ZIOT Demo database | | |
| Fields | Indexes | ForeignKeys | B17 Statistical database | |
| Field | | Type | Null | Extra |
| | | | No data | |

FIG. 13

Access control
pass record data        MySQL
                        Data table

Basic Information

Process node type: MySQL Data table

Process node name: MySQL Data table

Brief introduction: Please input a brief introduction

Select data source

Data source: Smart Park

Select data table:

Data table structure

| Fields | Indexes | ForeignKeys |
|--------|---------|-------------|
| Field  |         | Type        | t_area
t_assets
t_car
t_empty_park
t_group
t_group_person
t_guard
t_guard_record

FIG. 14

| Service process- | MySQL Data table | | | |
|---|---|---|---|---|
| Select data source | | | | |
| | * Data source: | Smart Park | | |
| | * Select data table: | t_area | | |
| Data table structure | | | | |
| Fields | Indexes | ForeignKeys | | |
| Field | | Type | Null | Extra |
| id | | bigint(20) | NO | auto_increment |
| name | | varchar(40) | YES | |
| ramark | | varchar(255) | YES | |
| senceId | | bigint(20) | YES | |
| coordinates | | text | YES | |

FIG. 15

| Access control data processing process | Location data transmission mqtt |

Basic information

- Process node type: MQTT Micro message queue
- Process node name: Location data transmission mqtt
- Brief introduction: Please input a brief introduction

Select data source

- Data source: Smart Park
- Communication protocol: ○ TCP  ○ WebSocket
- *Topic: locationInfo

Detailed configuration

- Execute action: ● publish  ○ subscribe
- Whether retain a message: ● YES  ○ NO
- Whether to delay publishing: ○ YES  ● NO
- Message retransmission: ● the message is sent at most once (QoS 0)  ○ the message is sent at least once (QoS 1)  ○ the message is sent only once (QoS 2)
- Whether group subscription is enabled: ○ YES  ● NO

FIG. 16

Add MQTT message queue instance

Connection information

 TCP connection    WS connection

User name:   Please input a user name of MQTT Broker

Password:    Please input a password of MQTT Broker

Namespace:   Please input a namespace

Basic information

*Alias:      Please input 2-50 Chinese, English, Number

Area:        Please input 2-50 Chinese, English, Number

Maximum number of topics:   Unlimited

DEscription: Please input a brief description of the MQTT message queue

 OK   Cancel

FIG. 17

Access control pass record data    MQTT message queue

Basic information

Process node type: MQTT micro message queue

Process node name: Please input 2-50 Chinese, English, Number

Brief introduction: Please input a brief introduction

Select data source

Data source: Please select MQTT micro message queue instance

Communication protocol: Smart Park

Demonstrate message queue

Topic: Astifen

Detailed configuration

Execute action:  publish   subscribe

Whether group subscription is enabled   YES   NO

ZIoT (Internet of Things) Platform/Message queue/MQTT queue details

Smart Park

Illustrated here is an introductory of examples, and the text may be relatively large...

Basic information | Topic management

Topic Name: Please input a topic name

| Name | Operation authority | Brief introduction | Creation time | Operation |
|---|---|---|---|---|
| locationInfo | Publish and subscribe | Real time positioning data | 2020-08-17 15:09:39 | Edit  Delet |
| Demonstration topic | Publish | | 2020-09-08 14:25:07 | Edit  Delet |

FIG. 19

- Access control pass record data
- MQTT message queue

Basic information

- Process node type: MQTT micro message queue
- Process node name: Please input 2-50 Chinese, English, Number
- Brief introduction: Please input a brief introduction

Select data source

- Data source: Smart Park
- Communication protocol: ○ TCP ○ WebSocket
- Topic: Please select a topic locationInfo Demonstration topic

Detailed configuration

- Execute action: ○ publish ○ subscribe
- Whether group subscription is enabled ○ YES ○ NO

FIG. 20

Service process- MySQL Data table

Basic information

Process node type: MySQL data table

Process node name: MySQL data table

Brief introduction: Please input a brief introduction

Select data source

Data source: Smart Park

Select data table: t_area

Data table structure

Fields | Indexes | ForeignKeys

| Field | Type | Null |
|---|---|---|
| id | bigint(20) | NO |
| name | varchar(40) | YES |
| ramark | varchar(255) | YES |
| senceId | bigint(20) | YES |

FIG. 28

In response to detecting a trigger operation that represents connecting two node plug-ins, connect the two node plug-ins with a logic relationship — 291

↓

In response to detecting a trigger operation that represents submitting node plug-in relationship, call respective API interfaces corresponding to the node plug-ins, so as to obtain the configuration information of the service process — 292

FIG. 29

DATA DISTRIBUTION SYSTEM AND DATA DISTRIBUTION METHOD

TECHNICAL FIELD

The present disclosure relates to the field of data processing network technologies, in particular to data distribution systems and data distribution methods.

BACKGROUND

In the Internet of Things (IoT), several IoT devices can report data to the IoT platform for use by the IoT platform. In practical applications, the IoT platform usually transmits the data to different users in real time, but there is a problem that some users cannot directly use the data.

SUMMARY

The present disclosure provides data distribution systems and data distribution methods, so as to solve the disadvantages of the related art.

According to the first aspect of the embodiment of the present disclosure, a data distribution system is provided, including a channel configuration module, a data engine module, a data processing module, a rule engine module, a preset database and an external interface module.

The channel configuration module is connected with an external device, and is configured to convert obtained device data of the external device into preset product model data and store the preset product model data in a message queue.

The data engine module is connected with the channel configuration module, and is configured to distribute the preset product model data obtained from the message queue to the preset database or the data engine module, or generate and send a control instruction to the data processing module and the rule engine module.

The data processing module is configured to process the preset product model data using a preset offline algorithm or a real-time algorithm in response to the control instruction, and push a processing result or store the processing result in real time.

The rule engine module is configured to determine whether a node corresponding to the preset product model data needs to be triggered in response to the control instruction; if the trigger is needed, send a preset type of trigger information to the node; if the trigger is not needed, send the preset product model data to the external device.

The external interface module is configured to feed back the preset product model data from the preset database in response to a call request of an external service system.

According to a second aspect of an embodiment of the present disclosure, a data distribution system is provided, including a channel configuration module and a data engine module.

The channel configuration module is connected with an external device, and is configured to convert obtained device data of the external device into preset product model data and store the preset product model data in a message queue.

The data engine module is connected with the channel configuration module, and is configured to distribute the preset product model data obtained from the message queue.

Optionally, the preset product model data includes three types of device data: a state parameter, a function parameter and a trigger parameter.

Optionally, the data distribution system further includes a data processing module, the data processing module is connected with the data engine module.

The data engine module is further configured to generate a control instruction according to initial configuration data, and send the control instruction to the data processing module.

The data processing module is configured to process the preset product model data using a preset offline algorithm or a real-time algorithm in response to the control instruction, and push a processing result or store the processing result in real time.

Optionally, the data distribution system further includes a rule engine module, the rule engine module is connected with the data engine module.

The data engine module is further configured to generate and sent a control instruction to the rule engine module when the preset product model data needs to trigger the rule engine.

The rule engine module is configured to determine whether a node corresponding to the preset product model data needs to be triggered in response to the control instruction; if the trigger is needed, send a preset type of trigger information to the node; if the trigger is not needed, send the preset product model data to the external device.

Optionally, the data engine module is further configured to push the preset product model data to a preset cache, such that the cache determines whether the node corresponding to the preset product model data needs to be triggered.

Optionally, data distribution system further includes an external interface module, the external interface module is connected with the data engine module.

The data engine module is further configured to store the preset product model data into a preset database.

The external interface module is configured to feed back the preset product model data from the preset database in response to a call request of an external service system.

According to a third aspect of an embodiment of the present disclosure, a data distribution method being applicable to the data distribution system of the first aspect is provided, the method including:

obtaining device data reported by the external device;

converting the device data into the preset product model data and storing the preset product model data in a message queue; and distributing the preset product model data obtained from the message queue.

Optionally, the preset product model data includes three types of device data: a state parameter, a function parameter and a trigger parameter.

Optionally, distributing the preset product model data obtained from the message queue includes:

obtaining initial configuration data, the initial configuration data includes configuration data which represents whether the preset product model data is processed using a preset algorithm;

obtaining a data processing algorithm for the preset product model data if the initial configuration data includes configuration data which represents that the preset product model data is processed using the preset algorithm; the data processing algorithm includes an offline algorithm or a real-time algorithm;

obtaining a processing result by processing the preset product model data based on the offline algorithm or the real-time algorithm; and storing or pushing the processing result.

Optionally, distributing the preset product model data obtained from the message queue includes:

pushing the preset product model data to a cache, such that the cache determines whether the preset product model data needs to trigger a rule engine;

in response to need to trigger the rule engine, determining whether a node corresponding to the preset product model data needs to be triggered;

if the trigger is needed, sending a preset type of trigger information to the node; and if the trigger is not needed, sending the preset product model data to the external device.

Optionally, distributing the preset product model data obtained from the message queue includes:

storing the preset product model data into a preset database based on a preset strategy, such that an external service system obtains the preset product model data through the preset database.

Optionally, obtaining the device data reported by the external device includes:

obtaining a preset data protocol;

if the device data satisfies the preset data protocol, storing the device data into a first message queue; if the device data does not satisfy the data protocol, obtaining device data which satisfies the preset data protocol by performing protocol conversion through SDK and storing the device data in the first message queue.

According to a fourth aspect of an embodiment of the present disclosure, an electronic device is provided, including:

at least one processor;

at least one memory storing a computer program executable by the processor;

wherein the at least one processor is configured to execute the computer program in the at least one memory to implement the above-mentioned method.

According to a fifth aspect of an embodiment of the present disclosure, a computer-readable storage medium is provided, wherein an executable computer program in the storage medium is executed by a processor to implement the above-mentioned method.

The technical solutions provided by the embodiments of the present disclosure can include the following beneficial effects.

It can be seen from the above-mentioned embodiments that the data distribution system in the embodiment of the present disclosure includes a channel configuration module and a data engine module. The channel configuration module is connected with an external device and is configured to convert obtained device data of the external device into preset product model data and store the preset product model data in a message queue. And the data engine module is connected with the channel configuration module and is configured to distribute the preset product model data obtained from the message queue. In this way, in the embodiment, the data distribution can be achieved by uniformly analyzing the device data, such that the users of the data distribution system can directly use the above-mentioned device data, which is beneficial to improving the stability, compatibility and portability of the system.

It should be understood that the above general description and the following detailed description are merely exemplary and explanatory, and do not limit the present disclosure.

BRIEF DESCRIPTION OF THE DRAWINGS

The accompanying drawings, which are incorporated in and constitute a part of the specification, illustrate embodiments consistent with the present disclosure and together with the description serve to explain the principles of the present disclosure.

FIG. 4 is a flowchart of a data distribution process configuration method according to an exemplary embodiment.

FIG. 5 is an effect schematic diagram of routing information of a configuration product according to an exemplary embodiment.

Figure 6:
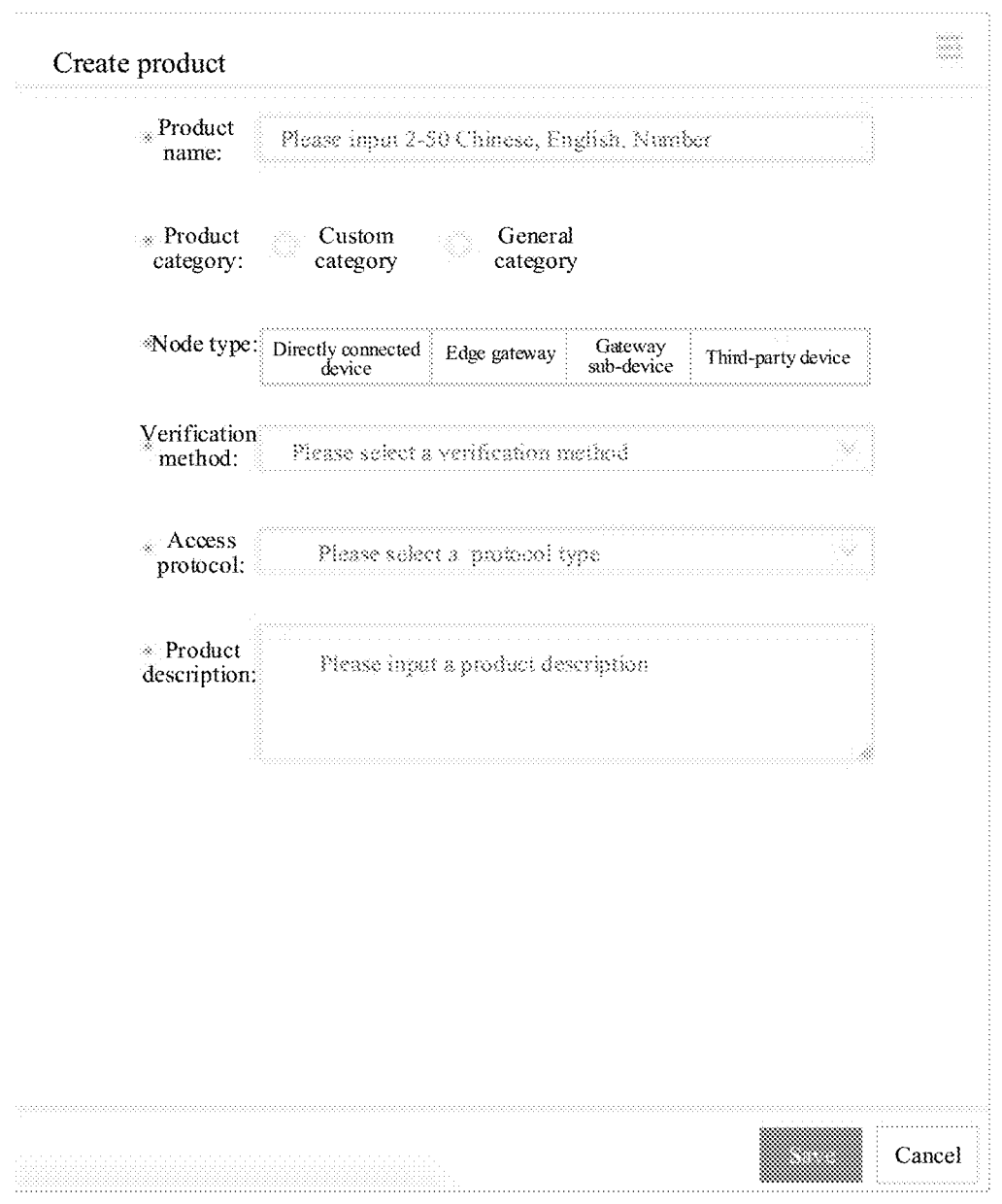

FIG. 6 is a schematic diagram of a tab page of creating a product according to an exemplary embodiment.

FIG. 9 is an effect schematic diagram of configuring an access control product routing channel according to an exemplary embodiment.

FIG. 10 is an effect schematic diagram of access control product definition according to an exemplary embodiment.

FIG. 11 is a schematic diagram of a tab page of an access control product routing channel according to an exemplary embodiment.

FIG. 13-FIG. 15 are schematic diagrams of tab pages for configuring a MYSQL data table according to an exemplary embodiment.

FIG. 16-FIG. 20 are schematic diagrams of tab pages for configuring a MQTT date table according to an exemplary embodiment.

FIG. 28 is an effect schematic diagram of a tab page for configuring a MYSQL data table according to an exemplary embodiment.

FIG. 29 is a flowchart of connecting node plug-ins according to an exemplary embodiment.

DETAILED DESCRIPTION OF THE EMBODIMENTS

Exemplary embodiments will be described in detail herein, examples of which are shown in the accompanying drawings. The following description refers to the drawings, unless otherwise indicated, the same numbers in different drawings represent the same or similar elements. The exemplary embodiments described below do not represent all embodiments consistent with the present disclosure. Rather, they are merely examples of apparatuses consistent with some aspects of the present disclosure as detailed in the appended claims.

Figure 1:
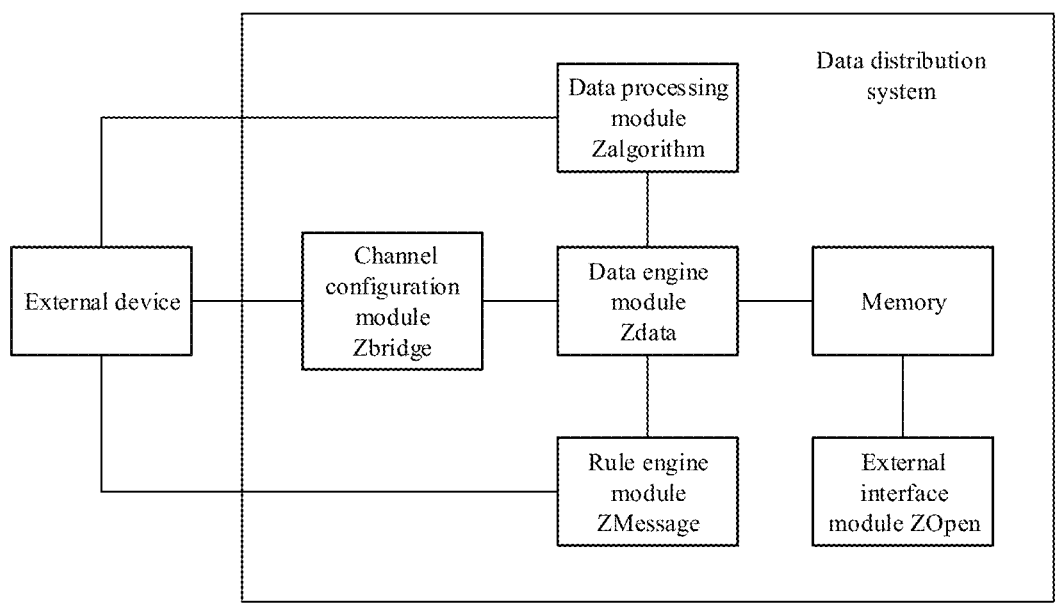
FIG. 1 is a block diagram of a data distribution system according to an exemplary embodiment.

To solve the above technical problems, the embodiment provides a data distribution system. FIG. 1 is a block diagram of a data distribution system according to an exemplary embodiment. The data distribution system can be a distributed system deployed in the cloud. The distributed data distribution system can be a system formed by a group of computers interconnecting through a network to send messages and communications and coordinate their actions. Different computers can interact with each other to achieve a common goal. The network can be an Internet of Things based on the Internet and/or telecommunication network, which can be a wired network or a wireless network, for example, which can be an electronic network capable of implementing information exchange functions, such as a local area network (LAN), a metropolitan area network (MAN), a wide area network (WAN), and a cellular data communication network.

The distributed computing system can have software plug-ins, such as software objects or other types of individually addressable isolated entities, such as distributed objects, agents, actor, virtual plug-ins, and the like. Generally, each such plug-in is individually addressable and has a unique identity (such as an integer, a GUID, a string or an opaque data structure, etc.) in a distributed system. In a distributed system that allows geographical distribution, an application can be resident in a cluster by deployment. There are various systems, plug-ins and network configurations that support distributed computing environments. For example, the computing systems can be connected together through a wired or wireless system, through a local network or a widely distributed network. At present, many networks are coupled to the Internet, which provides an infrastructure for widely distributed computing and includes many different networks, although any network infrastructure can be used for communications that may easily occur to the system, for example, as described in various examples.

The data distribution system provides the sharing of computer resources and services through the communication exchange between computing devices and systems. These resources and services include information exchange for an object (such as a file), a high speed cache storage apparatus and a disk storage device. These resources and services also include the sharing of processing capabilities across a plurality of processing units for load balancing, resource expansion, specialization of processing, etc. For example, the distributed data distribution system can include a host having a network topology and the network infrastructure such as client devices/servers, peer-to-peer or hybrid architectures.

The various techniques described in the present disclosure can be implemented in conjunction with hardware or software, or where appropriate, by a combination of both. The terms "plug-in", "module", "system", "platform" and the like, as used in the present disclosure, are likewise intended to refer to a computer-related entity, which is hardware, a combination of hardware and software, software or software in execution.

Referring to FIG. 1, a data distribution system includes a channel configuration module Zbridge and a data engine module Zdata.

The channel configuration module Zbridge is connected with an external device and is configured to convert obtained device data of each external device into preset product model data and store the preset product model data in a message queue.

The data engine module Zdata is connected with the channel configuration module Zbridge, and is configured to distribute the preset product model data obtained from the message queue.

In an embodiment, the channel configuration module Zbridge is connected with the external device, and can obtain the device data reported by the external device. The data distribution system or the channel configuration module can store a preset data protocol, such as a message queuing telemetry transport (MQTT), a http protocol, a XMPP protocol and a CoAP protocol. Taking the MQTT protocol as an example, the channel configuration module Zbridge can obtain the MQTT protocol and determine whether the device data satisfies the MQTT protocol. If the device data satisfies the MQTT protocol, the channel configuration module Zbridge can store the device data to MQTT Broker (i.e., a first message queue). If the device data does not satisfy the MQTT protocol, the protocol conversion is performed through SDK, and the device data is stored in the first message queue.

It should be noted that, the external device in the embodiment can include a device that needs to be externally connected to the system, such as a third-party device, a directly connected device, an edge gateway, etc. Accordingly, the device data reported by the external device can include image information collected by a camera, environmental data collected by a temperature and humidity sensor, and production data of a production device. It can be understood that the above-mentioned external device can be set according to specific scenarios, and the device data can be adjusted according to the external device, and the corresponding solution falls within the protection scope of the present disclosure.

In this embodiment, the channel configuration module Zbridge has pre-stored routing configuration information, the routing configuration information can include a topic path which specifies reading the device data from the first message queue, product model definition and data analysis.

In this embodiment, the channel configuration module Zbridge can monitor MQTT data in the first message queue. When the MQTT data exists in the first message queue, the MQTT data is read and converted into the preset product model data, and stored in a second message queue. The second message queue can be one of Message Queue, RabbitMQ, Redis, ZeroMQ, ActiveMQ, Kafka/Jafka. In the following embodiments, the second message queue is implemented by Kafka.

In this embodiment, the routing configuration information can include preset product model data, which includes three types of device data, i.e., a state parameter, a function parameter and a trigger parameter. The data format representing the same kind of products can be formed by setting the data type and data length of the parameters.

The state parameter is used to describe the state when the device is running, such as the current environmental temperature read by the environmental monitoring device. The state parameter can support GET and SET request manners, and the application system can set request for reading the state parameter. The function parameter refers to the ability or method that the device can be called externally, and can include an input parameter and an output parameter. Compared with the state parameter, the function parameter can implement more complex service logic through one piece of instruction, such as executing a specific task. The trigger parameter refers to an event when the device is running, which generally includes the notification information that needs to be perceived and processed by the outside, and can include a plurality of output parameters. For example, the information about the completion of a task, or the temperature of device failure or alarm, etc., can be subscribed and pushed. In other words, in this example, what the device is, what the device can do and which information the device can provide to the outside are described respectively from three functional dimensions: a state parameter, a function parameter and a trigger parameter, that is, the device data is defined.

In this example, the channel configuration module Zbridge provides a platform for multi-source heterogeneous device to convert product models. And the device data is divided into the state parameter, the function parameter and the trigger parameter, In this way, the device data of each external device is converted into the preset product model data, which has the following advantages.

First, the same or different types of products provided by different manufacturers can be unified into the same kind of products, so as to achieve the effect of product unification. In other words, no matter which manufacturer provides products, the products can be added to the system and can correspond to the corresponding classification, so as to enhance the applicable scope of the system. For example, access control device defines the state parameters of the product model, such as guardID, cardID, direction, etc., and the relevant state parameters in the corresponding device data are respectively represented as data.door, data.person, data.direction. The mapping of the corresponding state parameters is realized through the configuration information (JS, jar), thus achieving the analysis of the product model.

Secondly, the system converts all device data into the preset product model data, which can facilitate the system to process the preset product model data, for example, using a large data algorithm to process the above-mentioned data, mining out the data value or providing more valuable services for users. For details, please refer to the subsequent embodiments.

Third, for various parts of the system, the preset product model data can be directly used without re-conversion, thus improving the data utilization efficiency. In addition, the user can achieve the data analysis of the product model according to the simple configuration information, which avoids writing the data analysis codes respectively for various devices and improves the data analysis efficiency.

In this embodiment, the data engine module Zdata is connected with the channel configuration module Zbridge, and can monitor the preset product model data in the second message queue. As a core of the data distribution system, the data engine module Zdata can also be connected with the data processing module Zalgorithm, the rule engine module ZMessage, the external interface module ZOpen and the database, and can arbitrarily control processing manner of the data (real-time algorithm processing, offline algorithm processing, filtering processing), selection of the data channel and result processing of the data (stored in the database, determined by the rule engine, pushed to the external service system, directly output to the user, etc.), so as to achieve the analysis, distribution and storage of the preset product model data.

In an example, the data engine module Zdata is further provided with a filter script, such as a JS script or a JAR package, the filter script is uploaded or written by the user through the system configuration page. After the preset product model data is analyzed by the data engine module Zdata and before it is distributed, the analyzed data can be filtered according to the subscription demands of users, so as to better meet the user's demands. For example, a user A wants to obtain three types of data in the preset product model, and a user B wants to perform calculation according to five types of data in the preset product model, and three types or five types of data corresponding to the preset product model can be filtered out in advance through the filter script, thereby better meet the personalized subscription demands of the user A or the user B.

In an example, the data distribution system further includes a preset database and an external interface module ZOpen. The preset database can include but not limited to a Mysql database, a TiDB database, a FoundationDB database, etc. In this example, the preset database is implemented by the TiDB database. The TiDB database can extend horizontally seamlessly as data in the system grows, only more machines need to be added to meet the demands for the service growth, and the application layer may not concern the storage capacity and throughput. Moreover, the TiDB database can dynamically adjust load balance according to storage, network, distance and other factors, so as to ensure better reading and writing performance, thus meeting the demands of the data distribution system and improving the scalability, reliability and stability of the system.

In this embodiment, the data engine module Zdata stores the preset product model data when monitoring the preset product model data in a kafka queue. The data stored in the TiDB database can also include the result data pushed by the data processing module Zalgorithm, and also include the process data in the first message queue or the second message queue, which is convenient for external systems to query data. In this way, the service system reads the preset product model data through the external interface module ZOpen of the data distribution system, so as to achieve data standard query.

In an example, the data distribution system further includes a data processing module Zalgorithm connected with the data engine module Zdata. The data processing module Zalgorithm can be a large data platform Hadoop. The users only need to write corresponding algorithms and upload the algorithms to the data processing module Zalgorithm, which can support offline or real-time data processing and calculation. The data engine module Zdata can pre-store initial configuration data, the initial configuration data can be pre-configured by the user and can include configuration information such as whether a data processing algorithm needs to be used and which algorithm is used when using a data processing algorithm. The data processing algorithm includes an offline algorithm or a real-time algorithm. After the preset product model data is obtained from the kafka queue, the initial configuration data can be read to determine whether to trigger the data processing module Zalgorithm. After determining to trigger the data processing module Zalgorithm, the data processing module Zalgorithm can process the preset product model data using the offline algorithm or the real-time algorithm, and feed back the processing results to the users and store the processing results locally. That is to say, the data processing module Zalgorithm can also be used as a database to store the preset product model data, the process data and the result data. In an example, the offline algorithm can be implemented by SparkSQL, and the processing results can be stored in Hive. The real-time algorithm can be implemented by Saprk-Streaming, and the processing results can be pushed in real time through the message queue.

The offline algorithm can include but not limited to SparkSQL, Hive on Spark, Core, Streaming, MLlib, GraphX, etc., and the real-time algorithm can include but not limited to Flink, Storm, Spark Streaming, etc. It can be understood that the offline algorithm and the real-time algorithm are only used to distinguish the usage scenarios of the algorithms. For example, in a case that the real-time demand is not high, the real-time algorithm can also be implemented by using one of the above-mentioned offline algorithms. For another example, the offline algorithm can also be implemented by using the real-time algorithms. A skilled person can select an appropriate offline algorithm and real-time algorithm according to a specific scenario. Of course, in some scenarios, the above-mentioned offline algorithm or real-time algorithm also selects the large data algorithm. For example, if the device data is an image, the large data algorithm can be implemented by using an algorithm such as a neural network algorithm, the image is processed by the neural network algorithm and the image semantics are obtained.

In an embodiment, the data distribution system further includes a rule engine module ZMessage, the rule engine module ZMessage can store a preset rule, such as the environmental temperature does not exceed 50° C., the environmental humidity does not exceed 70%, etc. The corresponding rules can be selected and configured according to specific scenarios, and the corresponding solution falls within the protection scope of the present disclosure.

In this example, the rule engine module ZMessage is connected with the data engine module Zdata. The data engine module Zdata generates a control instruction when the preset product model data needs to trigger the rule engine and sends the control instruction to the rule engine module ZMessage, or the data engine module Zdata sends the preset product model data to the key-value storage system Redis, such that the Redis can determine whether the preset product model data needs to trigger the rule engine. The Rule engine module ZMessage is configured to determine whether a node corresponding to the preset product model data needs to be triggered in response to the control instruction; if the trigger is needed, send a preset type of trigger information such as the control instruction and alarm information to the node; and if the trigger is not needed, send the preset product model data to the external device. When sending the trigger information or the preset product model data to the to-be-triggered node, the type of the node such as mail, calling remote interface, short message, etc. can be obtained first, and then the sending manner or format of the information or data can be adjusted according to the type. In actual application, the triggered node may not support satisfying the MQTT protocol, in which case the information or data can be analyzed by ZEdgeSDK and then sent to the triggered node.

The data distribution system in the embodiment of the present disclosure includes the channel configuration module Zbridge and the data engine module Zdata. The channel configuration module Zbridge is connected with the external device and is configured to convert the obtained device data of each external device into the preset product model data and store the preset product model data in the message queue. The data engine module Zdata is connected with the channel configuration module Zbridge and is configured to distribute the preset product model data obtained from the message queue. In this way, in the embodiment, the data distribution can be achieved by uniformly analyzing the device data, so that the users of the data distribution system can directly use the above-mentioned device data, which is beneficial to improving the stability, compatibility and portability of the system.

Figure 2:
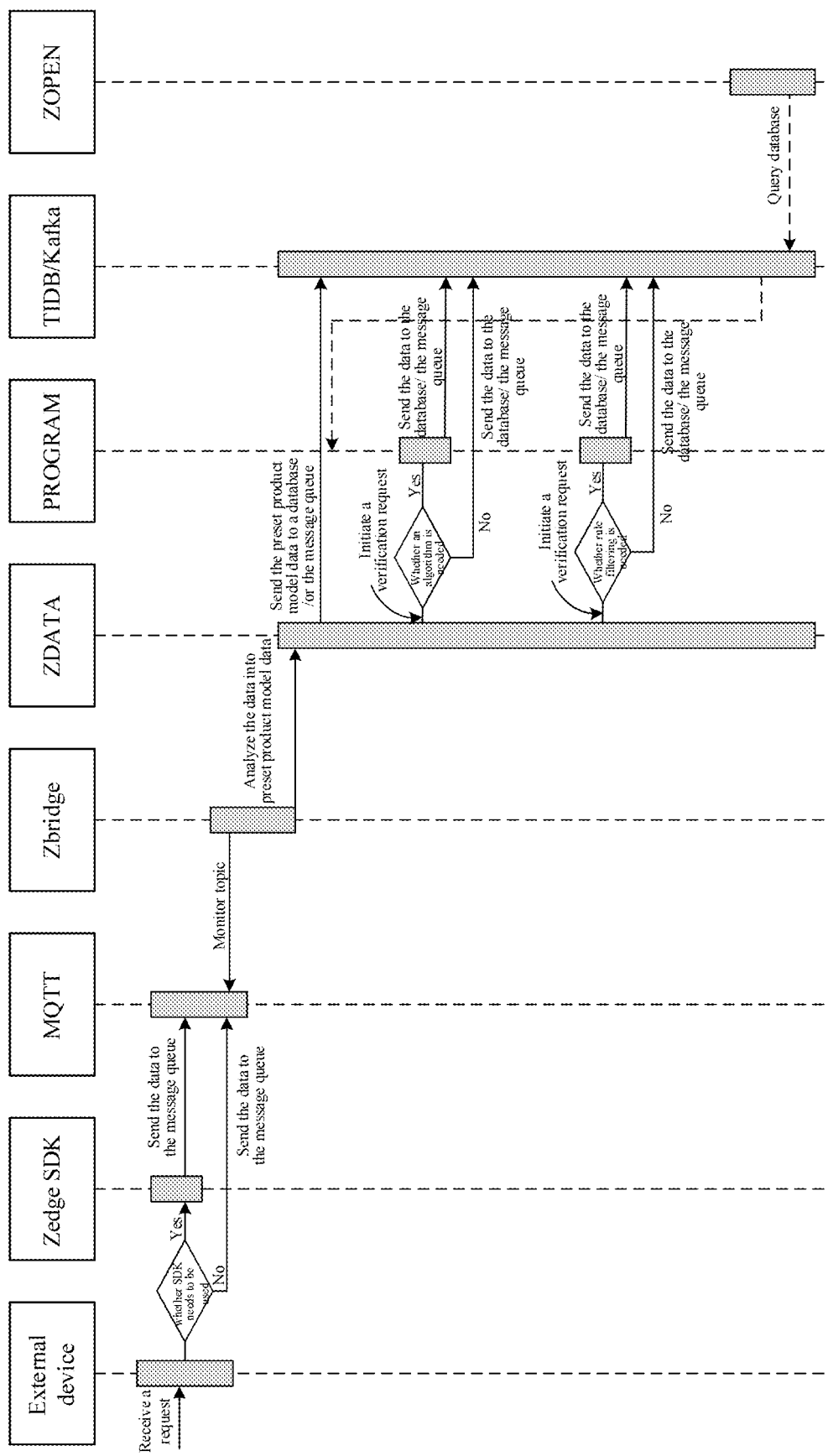
FIG. 2 is a timing diagram of data distribution according to an exemplary embodiment.

The above-mentioned data distribution system is described below in combination with the scenarios shown in FIG. 2 and FIG. 3, including:

1) Obtaining the data generated by an asset, where the asset refers to external devices that need to be externally connected, and these external devices can adopt external data and report the external data.

2) Transmitting the device data based on the MQTT protocol: determining whether the device data supports the MQTT protocol, if not, performing protocol conversion through SDK, and if yes, transmitting the device data to MQTT-BROKER based on the MQTT protocol. The MQTT-BROKER is a message queue, which is used for the transfer and transmission of the device data.

3) The ZBridge analyzes the device data into the preset product model data. The ZBridge monitors the data of the MQTT-BROKER, grabs the data when the MQTT-BROKER has data, converts the date into the preset product model data, and then distributes the preset product model data to the kafka queue. The relationship between the ZBridge and the following routing configuration is that: the ZBridge reads the configuration information of the routing configuration, and then grabs the corresponding device data from the MQTT-BROKER and converts it into the product model data.

It should be noted that transmitting the device data based on the MQTT protocol in 2) can also be implemented by the ZBridge.

In actual application, the initial configuration information in the ZBridg can include a JS script, a jar package, a python script or a PHP script, etc. For example, the ZBridge can achieve the product model conversion based on the JS script or the jar package written by the users. In an example, the ZBridge can analyze the JB script based on JS parsing engine or analyze the jar package based on pf4j plug-in, so as to perform product model processing on the data.

4) The ZData monitors the product model data in the kafka and makes determination in the data engine, and performs the following three operations:

4.1) Storing the product model data in the TiDB database. For example, the product model data can be filtered and processed using the filter script, and the data can also be processed using the large data/artificial intelligence algorithm. The processed result data and process data can be directly stored in the database for future use. The service system can read the data from the TiDB database through the external interface module ZOpen, and can also perform standard query.

Of course, the external interface module ZOpen can also send the data read from the TiDB database as downlink data to the ZMessage, such that the ZMessage can directly send the data to the ZEdge SDK or the device or determine whether an action node needs to be triggered. If the action node needs to be triggered, the mail can be sent, the remote interface can be called and the short message can be sent according to the type of the action node, or the trigger parameter of asset type can be triggered (i.e, sent directly to the ZEdge SDK or the device).

4.2) The ZData determines whether to use a preset processing algorithm to preset product model data according to the initial setting information. If yes, the category of the selected algorithm needs to be further determined. For example, the category can be the real-time algorithm, and the calculation is performed using SaprkStreaming. For another example, the category can be the offline algorithm, the calculation is performed using SparkSQL and the processing result is stored in Hive. After the processing ends, the service subscription manner in the initial setting information is determined, and the data can be pushed in real time through the Kafka or stored in the storage node.

4.3) The ZData maps the preset product model data to the Redis, the Redis is a key-value storage system. The Redis can determine whether to notify to trigger the rule engine. And if so, the control instruction can be sent to the Zmessage. The Zmessage can preprocess the preset product model data, and match the preset product model data with the preset trigger rules to constitute an event. The trigger operation is executed if the event satisfies the trigger rule.

The ZMessage determines whether a rule node needs to be triggered, if the rule node does not need to be triggered, the ZMessage sends the preset product model data or analyzes the preset product model data and then sends the preset product model data to the Zedege SDK or directly to the device. If the rule node needs to be triggered, the ZMessage continues to determine whether the action node needs to be triggered. If the action node needs to be triggered, the ZMessage sends the email, calls the remote interface and sends the short message according to the type of the action node, or triggers the trigger parameter of the asset type (i.e, directly sends to the Zedege SDK or the device).

The embodiment of the present disclosure also provides a data distribution process configuration method. FIG. 4 is a flowchart of a data distribution process configuration method according to an exemplary embodiment, which can be used in the data distribution system shown in FIG. 1. In practice, the users can configure the data distribution process on any electronic device in the data distribution system, or configure the data distribution process by connecting the other electronic devices to the data distribution system. For convenience of description, in the subsequent embodiments, the electronic device with the display screen that can trigger operation is taken as the executive body to describe various embodiments.

To facilitate understanding of the subsequent embodiments, the channel configuration module Zbridge, the data engine module Zdata, the data processing module Zalgorithm, the rule engine module ZMessage, the external interface module ZOpen and the database shown and the like in FIG. 1 are mapped with the plug-ins shown in the subsequent embodiment respectively, including:

The channel configuration module Zbridge corresponds to a message queue plug-in set, a database plug-in set or a filter script plug-in set.

The data engine module Zdata corresponds to the configuration information of the service process, that is, the data transmission, calculation and distribution among various modules or plug-ins are achieved through the configuration information.

The data processing module Zalgorithm corresponds to an algorithm plug-in set and a database plug-in set.

The rule engine module ZMessage corresponds to a filter script plug-in set and a database plug-in set.

The external interface module ZOpen corresponds to a database plug-in set and an external interface.

The database corresponds to a database plug-in set.

It is understandable that each of the above-mentioned modules can be an aggregation of at least one function, and the plug-in tends to be one function, such that each of the above-mentioned modules can correspond to at least one plug-in. In the subsequent embodiments, the module to which the plug-in belongs can be determined according to the correspondence between the plug-in and the module. In the case where the operation of the data distribution system shown in FIG. 1 is not affected, the variation solutions of dividing each plug-in into each module belong to the protection scope of the present disclosure.

Referring to FIG. 4, a data distribution process configuration method includes steps 41 to 43.

In step 41, in response to detecting a trigger operation that represents creating a service process of a data distribution service, a workbench of the service process is displayed.

In the embodiment, various plug-in sets can be pre-stored in the electronic device, including an initial plug-in set, a channel plug-in set and a processing plug-in set. Each plug-in in the channel plug-in set is between each plug-in in the initial plug-in set and each plug-in in the processing plug-in set, or between two plug-ins in the processing plug-in set. The initial plug-in set includes a data integration plug-in set, the channel plug-in set includes a message queue plug-in set, and the processing plug-in set includes a database plug-in set, a filter script plug-in set, an algorithm plug-in set and a rule engine plug-in set. Of course, an external interface plug-in set can also be included to create a connection between an external device and the database plug-in or the message queue plug-in or the filter script plug-in. The technician can select the appropriate plug-in set according to the scenario.

In the embodiment, the data integration plug-in set mainly unifies the hidden underlying data details in the data logic view through the node plug-in of the routing channel type, such that different data sources can be mapped to the node plug-in. Referring to FIG. 5, the underlying data logic configuration (i.e., configured information items) of the node plug-in can be to select a product data source (for example, the asset shown in FIG. 3), and the information of the product data source includes route configuration information, product model definition information and data analysis information, then select the route to which the product data source needs to subscribe and select the state parameter in product model information through data filtering.

Figure 7:
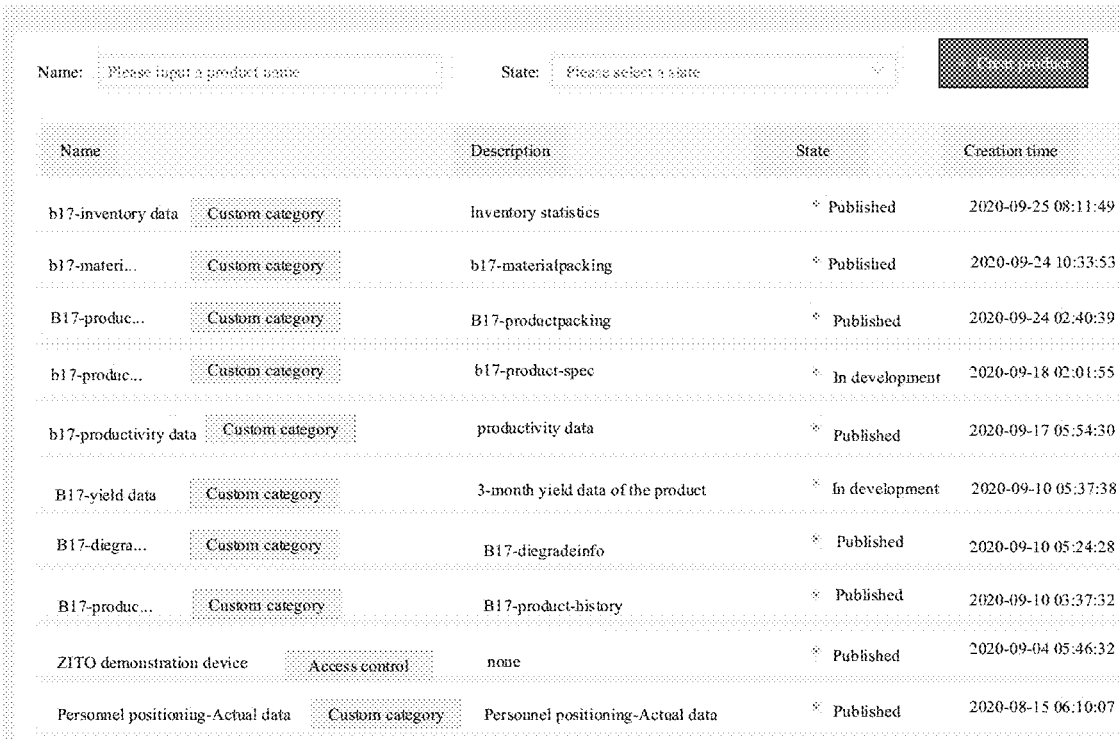
FIG. 7 is an effect schematic diagram of a product queue according to an exemplary embodiment.

Take creating a product (i.e., the data source) as an example, including:

In the example, a create product button is displayed on the display interface of the system. The electronic device can pop up a pop-up box in the display interface in response to detecting a trigger operation that represents creating the product, and the effect is shown in FIG. 6. Referring to FIG. 6, the pop-up box includes product-related information, such as a product name, a product category (such as a custom category and a general category), node data (such as a directly connected device, an edge gateway, a gateway sub-device, a third-party device, etc.), an authentication method, an access protocol and a product description, etc. The contents in the pop-up box can be adjusted according to specific scenarios. The electronic device can further fill in various product information and obtain input data according to the user's trigger operation. When detecting that the user stores the above-mentioned input data, the electronic device can call the API interface to generate new product information and display the newly generated related products in a list. The effect is shown in FIG. 7.

Figure 8:
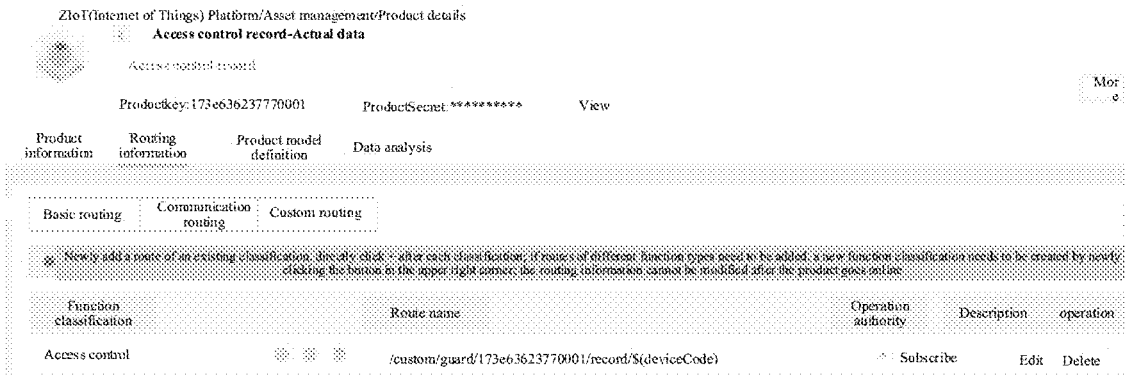
FIG. 8 is a schematic diagram of an access control product scenario according to an exemplary embodiment.
Figures 9, 10:
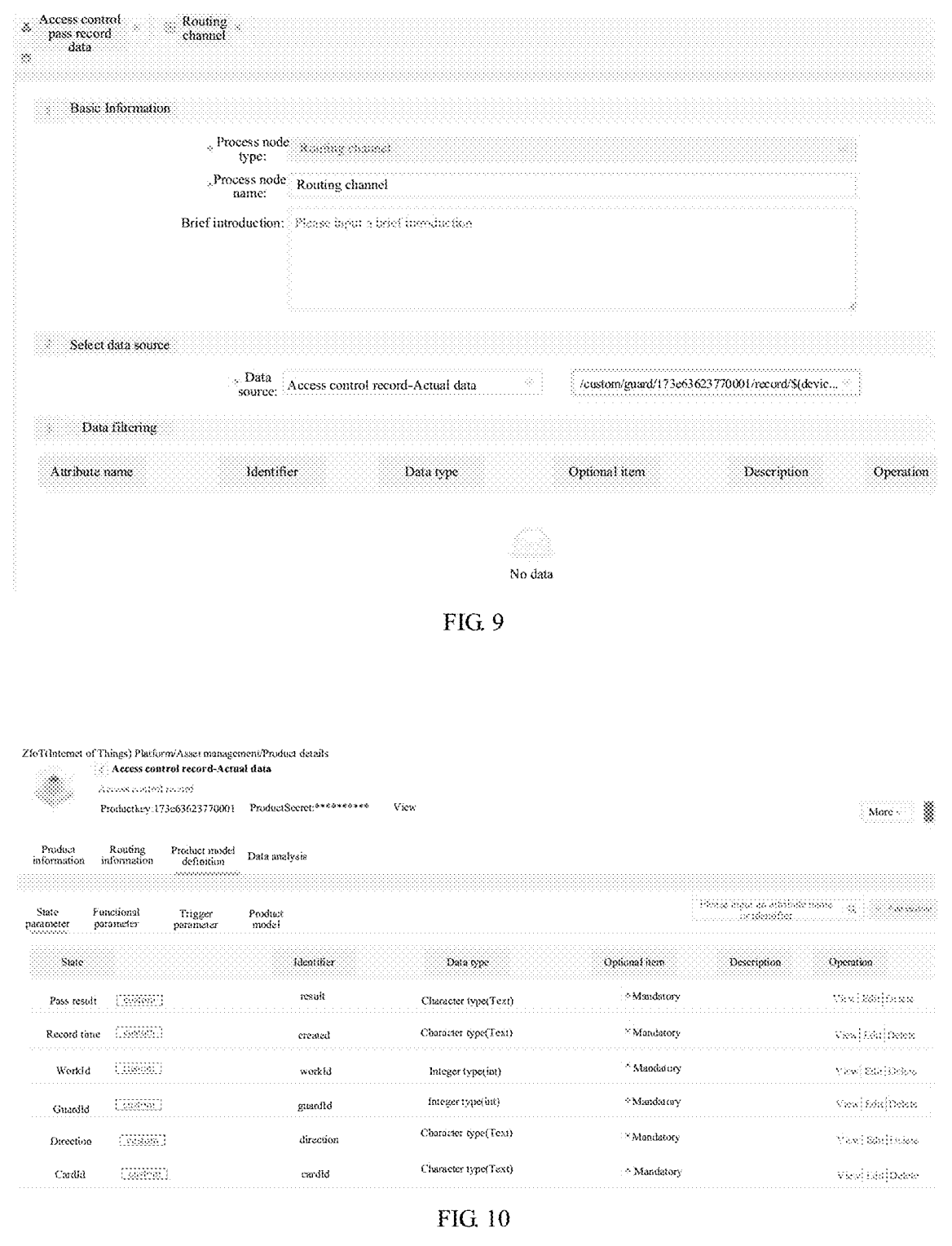
Figure 12:
FIG. 12 is a schematic diagram of a tab page of a newly added data source according to an exemplary embodiment.

Taking the configuration of an access control product as an example, the electronic device can display a configuration page of the access control product in response to detecting a trigger operation that represents configuring the routing information, and the effect is shown in FIG. 8 and FIG. 9. Referring to FIG. 9, the electronic device can obtain the routing information input by the user, such as information configuration of basic routing, communication routing and custom routing. The configuration of the custom routing information is the routing selection after the product information is selected by the data source of the later routing channel plug-in.

Referring to FIG. 10 and FIG. 11, the electronic device can obtain the product model information input by the user, such as the state parameter, the function parameter, the trigger parameter, and the information configuration of the product model DSL in response to detecting a trigger operation that represents configuring the product model information. That is, the electronic device can detect that the user clicks the newly added custom button to pop up the pop-up box, and obtain the relevant information input according to the prompt on the display interface to configure the information defined by the product model, such as the state parameter, the function parameter, the trigger parameter, etc. The newly added information cannot be customized after the product goes online. The configuration of state parameter information defined by the product model is the product state parameter information that the subsequent routing channel plug-in needs data filtering.

Figure 3:
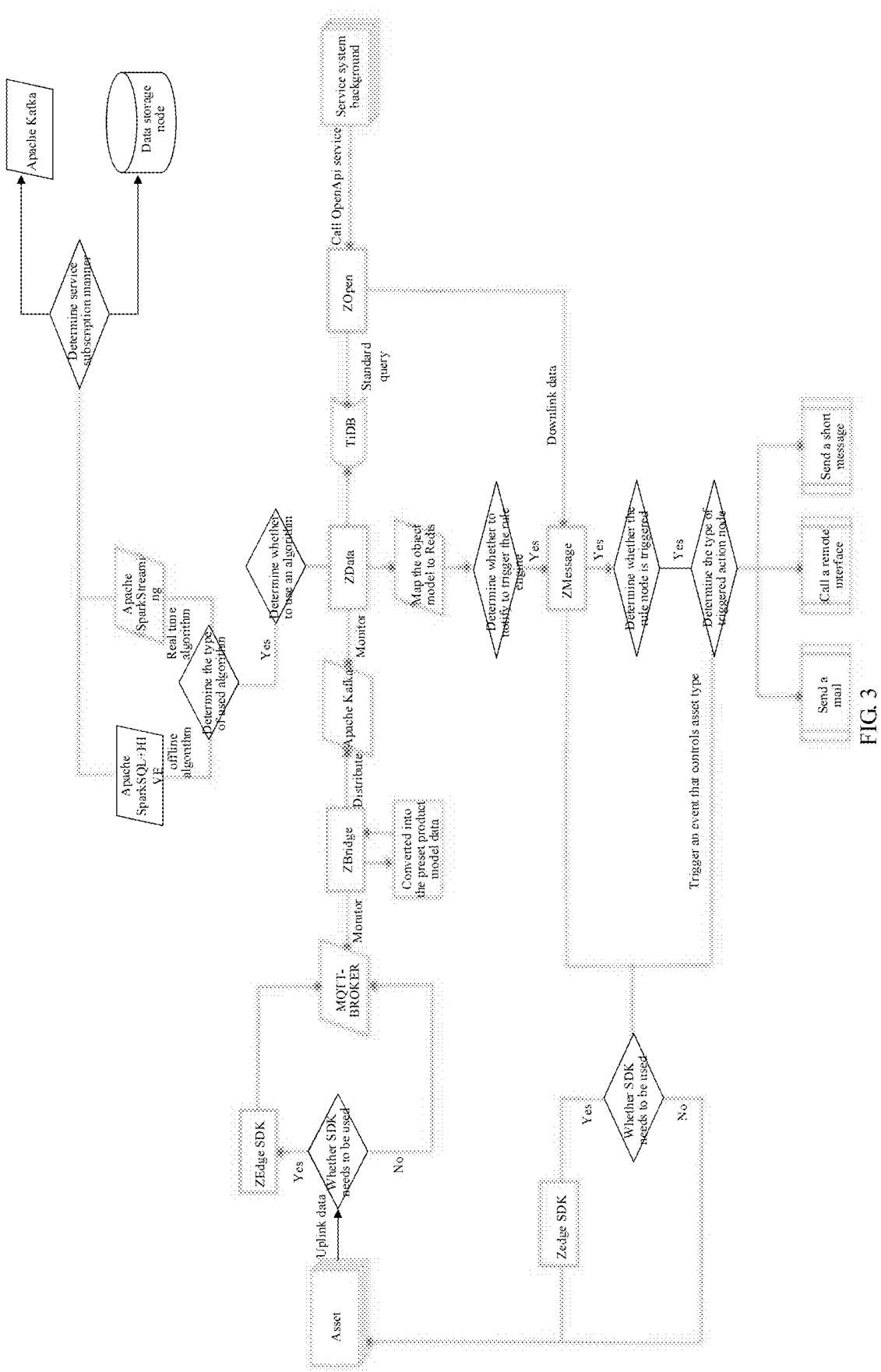
FIG. 3 is a flowchart of data distribution according to an exemplary embodiment.

In the embodiment, the database plug-in set executes the operations such as data establishment, storage, update, query, and deletion mainly by one of the MYSQL data table plug-in, the TIDB data table plug-in and the HBase data table plug-in, which corresponds to the data storage node or the TiDB database in FIG. 3. The underlying data logic configuration of these node plug-ins can be to select an instance of a data source storage node. The information of the storage node instance includes a database version, IPV4 address information, a port number, an instance name, a database name, a user name, a password and an area where the storage node is located. The data table and table structure information of the data table can be selected by selecting an instance of the storage node, or the data table and table structure of the data table can be created for the instance by filling in DDL script data.

Taking the creation of a MySQL storage instance as an example, as shown in FIG. 12, FIG. 13, FIG. 14 and FIG. 15, an add node button can be displayed on the display interface of the system. The electronic device can detect whether the user clicks the add node button, and the electronic device can pop up the pop-up box in the display interface in response to detecting that the user clicks the add node button. The pop-up box includes connects such as a selected version, connection information, an instance name, a library name, a user name, a password, an alias and an area. The electronic device can further fill in various product information and obtain input data according to the user's trigger operation. When detecting that the user stores the above-mentioned input data, the electronic device can call the API interface to generate a new storage instance and display the new storage instance in the list. The list is the data source information in the MySQL data table plug-in configuration information. In this way, in this example, the data table information of the storage instance can be obtained by calling the API interface through the filled-in storage instance information, and various attribute information of the data table can be obtained through the data table information. The obtained information is the selected data table and data table structure information in the information configured by the MySQL data table plug-in.

In the embodiment, the message queue plug-in set is mainly used for asynchronous processing, application decoupling and traffic cutting through a MQTT message queue plug-in (corresponding to the MQTT BROKER in FIG. 3), a Kafka message queue plug-in (corresponding to the apaache kafka in FIG. 3) and a AMQP message queue plug-in. The underlying data logic of these node plug-ins can be to select a message queue instance of the data source. The information of the message queue instance includes the TCP connection, the WS connection, the user name, the password, the namespace, the area and the topic. The communication protocol TCP connection or WS connection, the topic and its detailed configuration, such as the selection of execution actions, whether to retain messages, whether to delay publishing, message retransmission and whether to group subscribes and other configuration information can be selected by selecting the message queue instance.

Taking the creation of the MQTT message queue as an example, refer to FIG. 16, FIG. 17, FIG. 18, FIG. 19 and FIG. 20, and an add instance button can be displayed on the display interface of the system. The electronic device can pop up the pop-up box on the display interface in response to detecting a trigger operation that represents adding the instance. The pop-up box can include the connection information (such as TCP connection, WS connection, user name, password, namespace), the basic information (such as alias, area, maximum topic number, description content), etc. The contents in the pop-up box can be adjusted according to specific scenarios. The electronic device can fill in various instance contents according to the user's trigger operations, and the electronic device can obtain the input data. When detecting that the user stores the input data, the electronic device can call the API interface to generate a new queue instance and display new queue information in the list. The list is the data source information in the MQTT message queue plug-in configuration information.

Continue to configure the topic information of the MQTT message queue as an example, and the topic selection information after the data source can be selected in the MQTT message queue plug-in configuration information.

In the embodiment, the filter script plug-in set can include the JS script plug-in, the jar package plug-in, the python script plug-in or the PHP script plug-in, etc., which are used for filtering data to filter out data items required by the users. For example, the user A wants to get 3 items of data in the data, and the user B wants to perform calculation based on 5 items of data in the data, such that the corresponding 3 or 5 items of data can be filter out in advance through the filter script, so as to better meet the personalized subscription demands of the user A or the user B. Of course, the technician can further use the script plug-ins written in other programming languages, and the corresponding solutions falls within the protection scope of the present disclosure.

In the embodiment, the algorithm plug-in set can include an offline algorithm plug-in and a real-time algorithm plug-in, which are used to calculate the data. The offline algorithm plug-in can include but not limited to SparkSQL plug-in, Hive on Spark plug-in, Core plug-in, Streaming plug-in, MLlib plug-in, GraphX plug-in, etc. The real-time algorithm can include but not limited to Flink plug-in, Storm plug-in and Spark Streaming plug-in.

Figure 21:
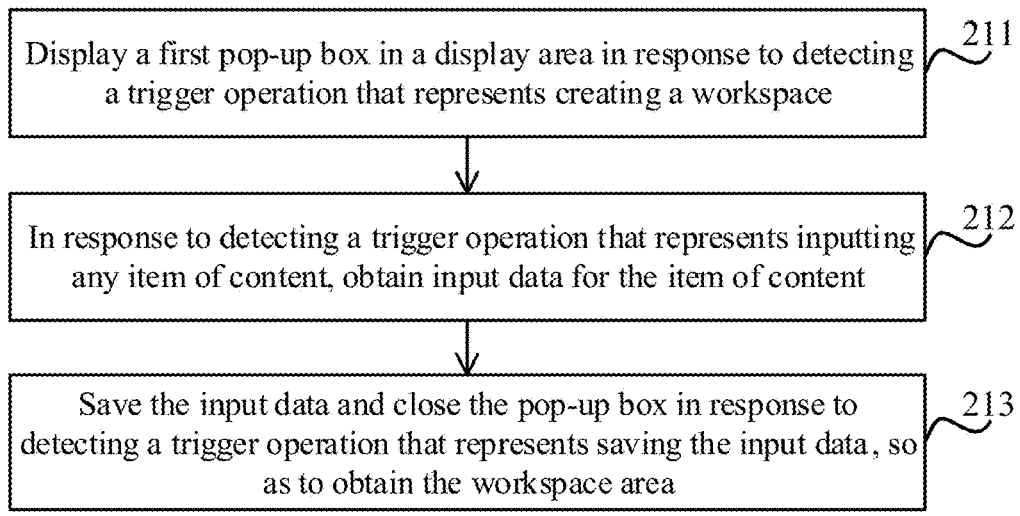
FIG. 21 is a flowchart of creating a workspace area according to an exemplary embodiment.
Figure 22:
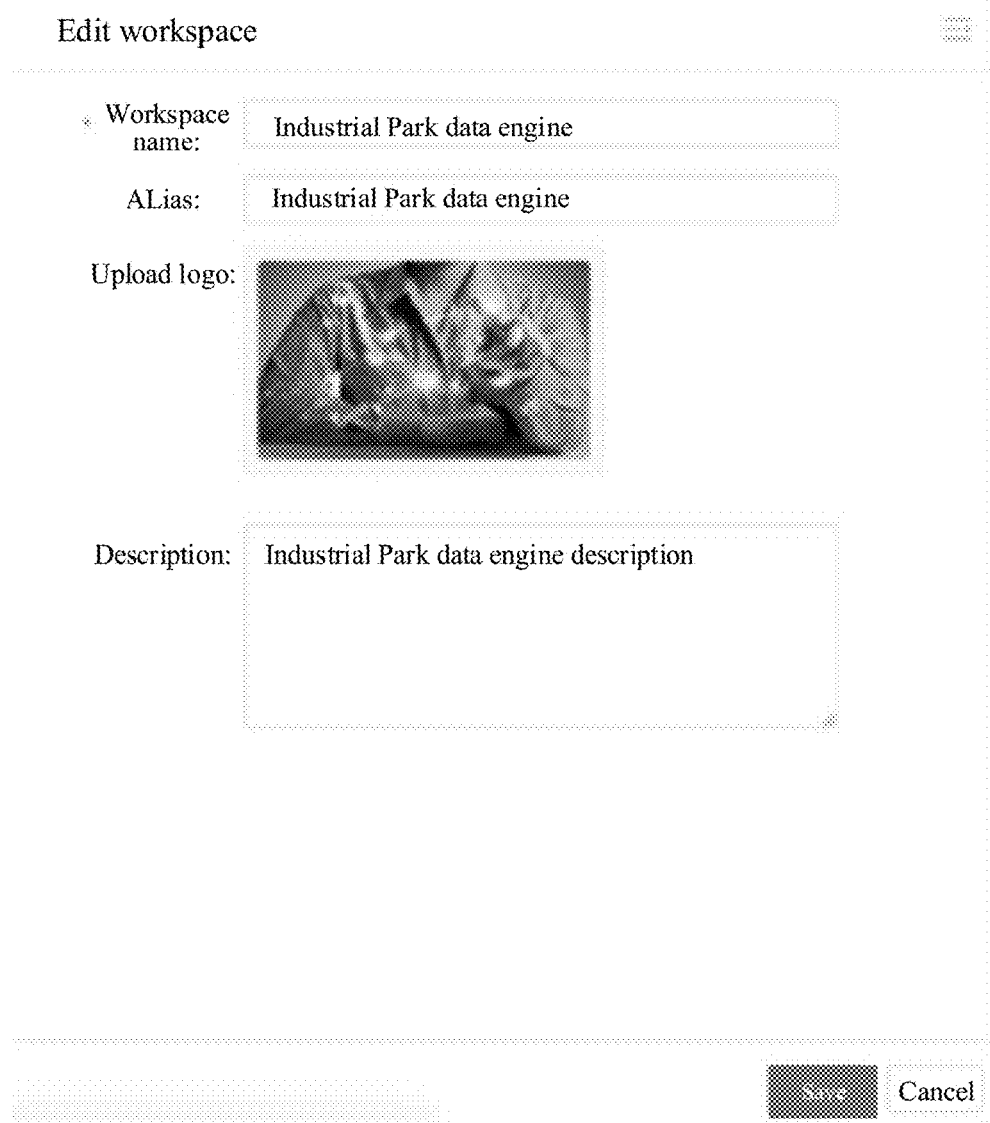
FIG. 22 is an effect schematic diagram of a pop-up box according to an exemplary embodiment.

In the embodiment, after configuring various plug-ins, a service process can be created based on the above-mentioned plug-ins. First, a workspace area is created. Referring to FIG. 21, in step 211, the electronic device can display a first pop-up box in a display area in response to detecting a trigger operation that represents creating a workspace. The first pop-up box includes at least one item of contents of a workspace name, an alias, a logo picture and a space description, and the effect is shown in FIG. 22. In step 212, the electronic device can, in response to detecting a trigger operation that represents inputting any item of content, obtain input data for the item of content. In step 213, the electronic device can save the input data and close the pop-up box in response to detecting a trigger operation that represents saving the input data, so as to obtain the workspace area. For example, the electronic device can display a newly added workspace area button in the display interface. When the user clicks the newly added workspace area button, a right drawer style pop-up box can pop up. After filling in the workspace name and alias, uploading the logo picture and inputting the description of the space, the user can click the save button below. The electronic device can call the API interface of saving space information, and after the interface is successfully called, save the relevant information, close the pop-up box, and display the newly added workspace in the workspace area.

For another example, after adding the new workspace area, the content of the workspace area can also be modified. At this time, an edit button that needs to modify the workspace content can be displayed in the display interface, and a right drawer style pop-up box can pop up. There are relevant workspace contents in the pop-up box, and the content that needs to be modified can be filled in, then the save button is clicked to call the API interface of modifying the space information. After the interface is successfully called, the relevant information is modified and the pop-up box is closed.

Figure 23:
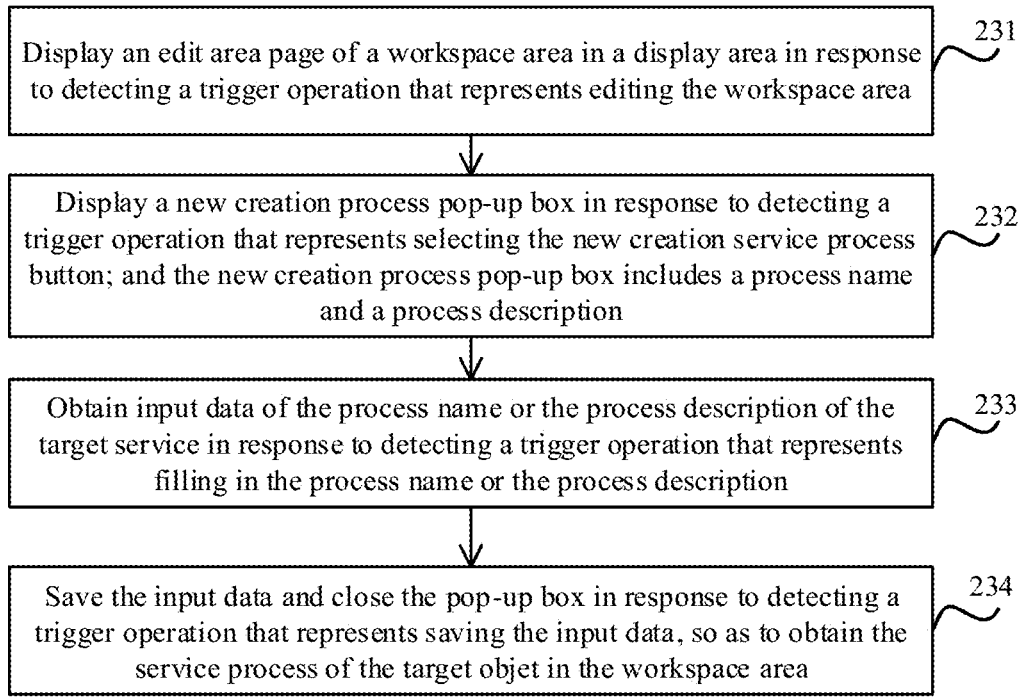
FIG. 23 is a flowchart of creating a service process according to an exemplary embodiment.

In the embodiment, a new service process can be created in various workspace areas. Referring to FIG. 23, in step 231, the electronic device can display an edit area page of a workspace area in a display area in response to detecting a trigger operation that represents editing the workspace area. The edit area page includes a new creation service process button. In step 232, the electronic device can display a new creation process pop-up box in response to detecting a trigger operation that represents selecting the new creation service process button. The new creation process pop-up box includes a process name and a process description. In step 233, the electronic device can obtain input data of the process name or the process description of the data distribution service in response to detecting a trigger operation that represents filling in the process name or the process description. In step 234, the electronic device can save the input data and close the pop-up box in response to detecting a trigger operation that represents saving the input data, so as to obtain the service process of the data distribution service in the workspace area. It should be noted that the newly added service process is only a name, and the service process has not been configured yet.

Figure 24:
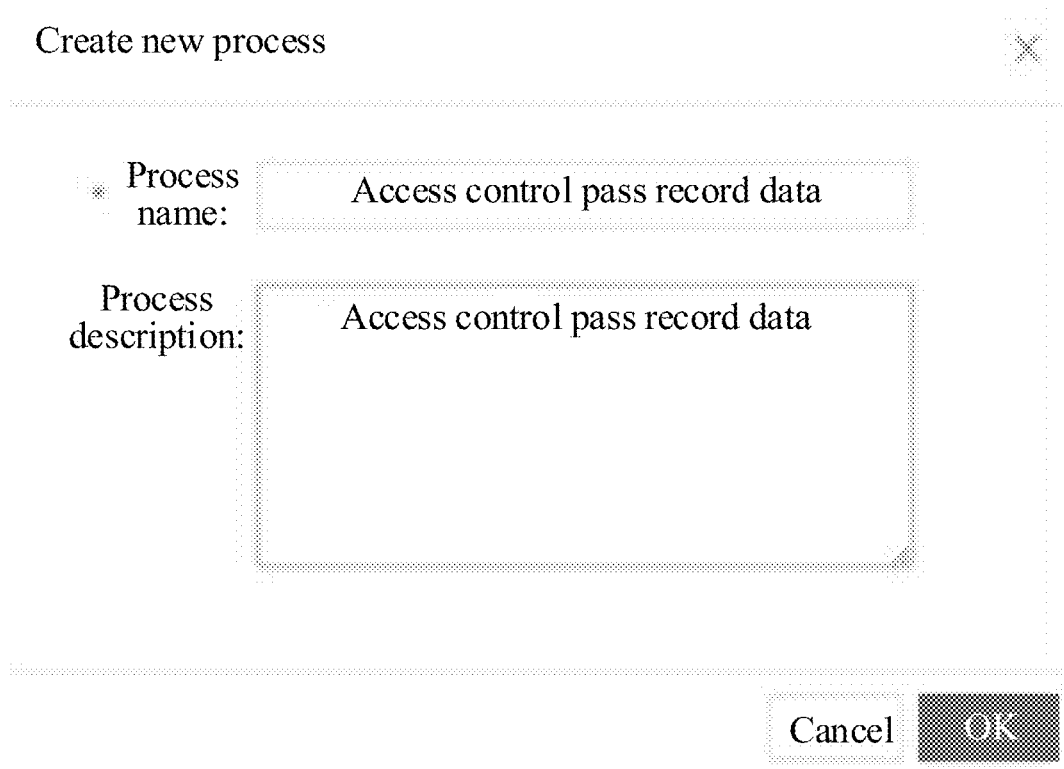
FIG. 24 is an effect schematic diagram of creating a new process according to an exemplary embodiment.

For example, the electronic device can display a list of the workspace area in the display interface. The user can click on a certain workspace that needs to be entered, and the display interface can jump to the edit area page of the workbench. Then, the user can click on a title of the service process, and the new creation service process button can pop up below the title. If the user clicks on the new creation service process button, a new creation process pop-up box can pop up. The new creation process pop-up box can include the process name and the process description, and the effect is shown in FIG. 24. At this point, the user can fill in the process name and the process description in the pop-up box, and click a OK button below after filling in. At this time, the electronic device can call the API interface to save the process information, and can display the newly added service process under the service process after closing the pop-up box.

In step 42, in response to detecting a trigger operation that represents dragging the node plug-in to the canvas, a plurality of node plug-ins of the service process are obtained.

Figure 25:
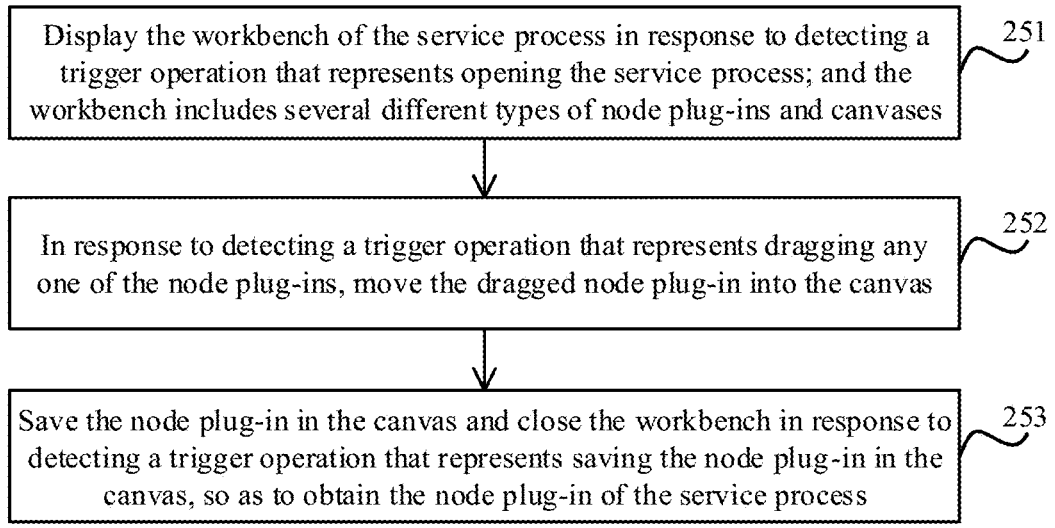
FIG. 25 is a flowchart of obtaining a node plug-in according to an exemplary embodiment.

In the embodiment, the electronic device can obtain the node plug-in of the service process of the data distribution service. Referring to FIG. 25, in step 251, the electronic device can display the workbench of the service process in response to detecting a trigger operation that represents opening the service process. The workbench includes an area for displaying several different types of node plug-ins and an area for displaying the canvas. The node plug-ins in the workbench are the node plug-ins preset in step 41, and they are all displayed in the workbench at this time, which is convenient for the user to select. In step 252, the electronic device can, in response to detecting a trigger operation that represents dragging any one of the node plug-ins, move the dragged node plug-in into the canvas. It is understandable that the node plug-in dragged by the user is the plug-in required by the data distribution service. In step 253, the electronic device can save the node plug-in in the canvas and close the workbench in response to detecting a trigger operation that represents saving the node plug-in in the canvas, so as to obtain a plurality of node plug-ins of the service process.

Figure 26:
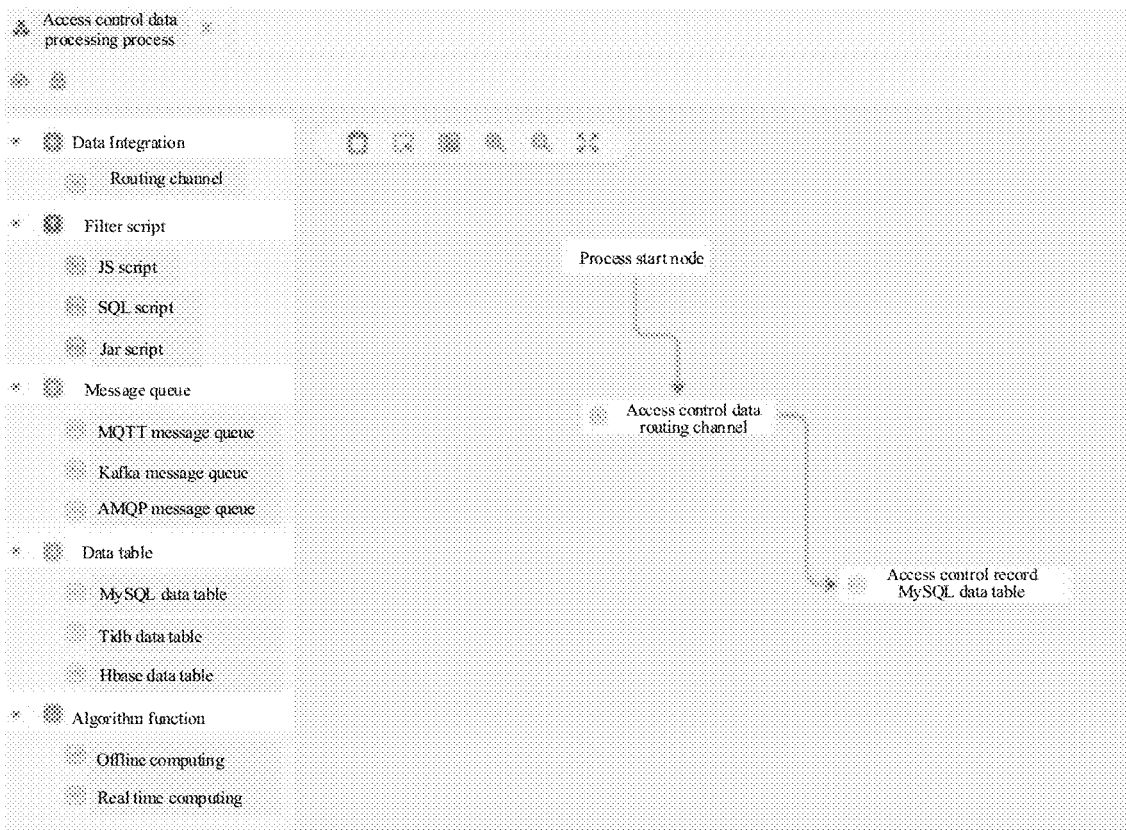
FIG. 26 is an effect schematic diagram of a workbench and obtaining a node plug-in according to an exemplary embodiment.

For example, after creating a new service process, the user can click on the newly-created service process. At this time, the workbench of the service process can be expanded on the right side of the service process queue in the display area, and the effect is shown in FIG. 26. The workbench shown in FIG. 26 includes a node plug-in on the left and a canvas on the right. The node plug-in can include routing channel nodes of data integration type, JS script nodes, SQL script nodes and Jar script nodes of filter script type, MQTT message queue nodes, Kafka message queue nodes and AMQP message queue nodes of message queue type, MySQL data table nodes, TIDB data table nodes and HBase data table nodes of data table type, offline calculation nodes and real-time calculation nodes of algorithm function type, etc. The user can drag the node plug-in required by the service process into the canvas to generate a basic plug-in.

The user can arbitrarily process the plug-ins in the plug-in set in series according to the demands for the data distribution service, so as to achieve the purposes of data acquisition, conversion, filtering, calculation and storage. For example, a start node is selected first, and the plug-ins in the channel plug-in set are added after the start node, then the plug-ins in the processing plug-in set are added, so as to achieve the data transmission, processing and distribution of the corresponding message queue. If no message queue is added, the system can use the preset or default message queue for data transmission. In specific implementation, after processing the plug-ins in the plug-in set, an upper-level service system can query the data or display the data in real time through the external interface Zopen API.

Figure 27:
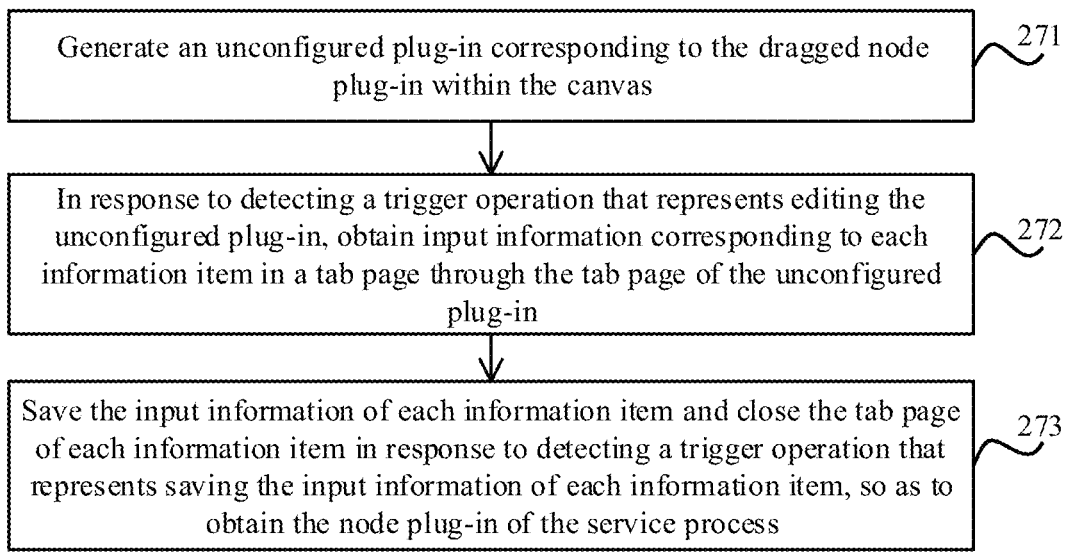
FIG. 27 is a flowchart of configuring node plug-in information according to an exemplary embodiment.

After moving one of the node plug-ins into the canvas, the information of the process node plug-in can be configured. Referring to FIG. 27, in step 271, an unconfigured plug-in is generated in the canvas. In step 272, the electronic device can open a tab page of the unconfigured plug-in in response to detecting a trigger operation that represents editing the unconfigured plug-in, such as clicking, double clicking, etc., and the tab page includes the information items that need to be configured for the initial node plug-in. When it is detected that the user clicks on each information item, the user can input information in the edit box of each information item, and the electronic device can obtain the input information corresponding to each information item. In step 273, the electronic device can save the input information of each information item and close the tab page of each information item in response to detecting a trigger operation that represents saving the input information of each information item, so as to obtain a plurality of node plug-ins of the service process.

Taking the configuration of a routing channel node plug-in as an example, the user can double-click the routing channel node plug-in in the canvas, and at this time, a tab page can be generated on the process workbench. The tab page includes process node name, brief introduction, data source information and data filtering, etc. The user can first fill in the node name and the brief introduction in the basic information, select the data source information, and then select the associated routing information after selecting the data source information. Then, the selection of the data filtering is performed, the "add a line" button below is clicked to pop up a pop-up box. There is data source list information which can be selected in the pop-up box. The required data source information is selected and the OK button is clicked to generate the filtered data source list information. Finally, the button for saving the plug-in is clicked, and the electronic device can call the API interface for saving the routing channel node plug-in, so as to save the information configured by the routing channel node. After the save is successful, the tab page is closed and a complete service process node is become on the canvas.

Taking the configuration of the Jar script node information as an example, the electronic device can display the tab page of the MYSQL data table according to the user's trigger operation, and the effect is shown in FIG. 28. As shown in FIG. 28, the tab page includes: process node type, process node name, brief introduction, data source, selection data table, data table structure, etc. The user can first fill in the node name and the brief introduction in the basic information, then click a file upload button below to select the required jar script file to upload. After calling the API interface to upload the file successfully, the electronic device can return a file download address and automatically fill it into a plug-in address information input box. Finally, after detecting that the user clicks the button for saving plug-in, the electronic device can call the API interface of saving plug-in to save the information configured by the Jar script node. After the save is successful, the tab page is closed and a complete service process node is become on the canvas.

Taking the configuration of the MQTT message queue node information as an example, the electronic device can display the tab page of the MYSQL data table according to the user's trigger operation, and the effect is shown in FIG. 16. The tab page includes process node type, process node name, brief introduction, data source, communication protocol (such as TCP and WebSocket), topic, execution action, whether to retain message, whether to delay publishing, message retransmission (such as the message is sent at most once, the messages is sent at least once, and the message is sent only once), and whether to enable group subscription, etc. The node name and the brief introduction in the basic information can be filled in first. Then, the data source information is selected, which includes that the communication protocol type is selected and the topic type is selected. Then, the execution action is selected, whether to retain message is determined, whether to delay publishing is determined, how many seconds to delay is determined if delay publishing, the times of the message retransmission are selected, and whether to enable group subscription is determined. Finally, after detecting that the user clicks the button for saving plug-in, the electronic device can call the API interface of saving plug-in to save the information configured by the MQTT message queue node. After the save is successful, the tab page is closed and a complete service process node is become on the canvas.

In step 43, in response to detecting a trigger operation that represents connecting the node plug-ins, configuration information of the service process is obtained, and the configuration information represents a data distribution process from a data source end to a data receiving end.

In the embodiment, after selecting and configuring each of the node plug-ins, each of the node plug-ins can be connected to obtain a service process. Referring to FIG. 29, in step 291, the electronic device can, in response to detecting a trigger operation that represents connecting two node plug-ins, connect the two node plug-ins with a logic relationship. In step 292, the electronic device can, in response to detecting a trigger operation that represents submitting node plug-in relationship, call respective API interfaces corresponding to the node plug-ins, so as to obtain the configuration information of the service process. It is understandable that, at this time, the service processes in the workspace area constitute a channel for process transmission, calculation, filtering and distribution from the data source end to the data receiving end.

Figure 30:
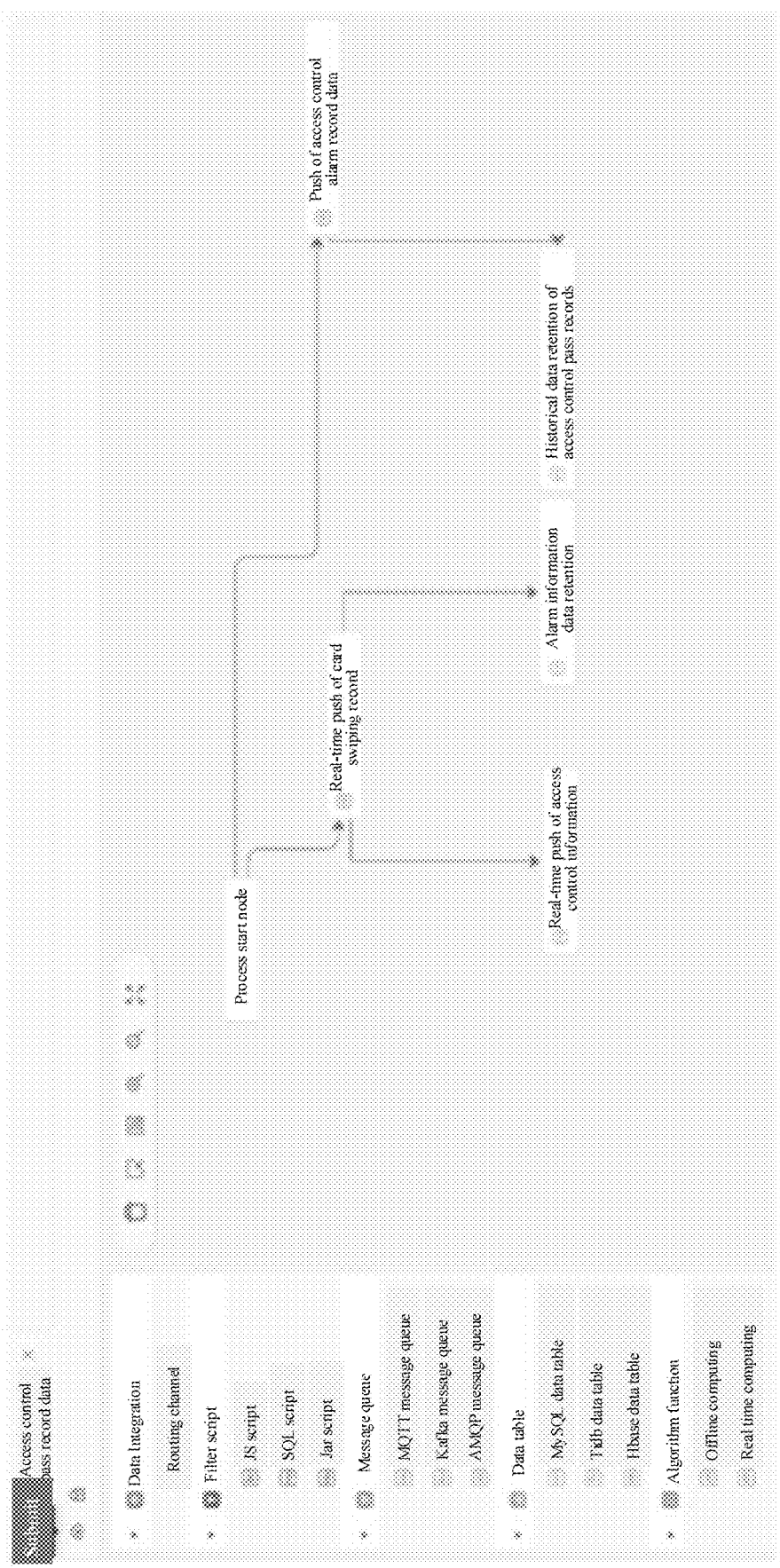
FIG. 30 is an effect schematic diagram of a service process according to an exemplary embodiment.

It should be noted that in the embodiment, the service process relationship diagram starts from the process start node, the process start node can first is connected to at least one node plug-in. In addition, a node plug-in can be connected to a plurality of other nodes, and the plurality of other different nodes can also be connected to the node plug-in. However, the connection loopback between the two nodes is not supported in the embodiment. For example, after the node plug-in A is connected to the node plug-in B, the node plug-in B cannot be connected back to the node plug-in A. At the same time, the connection between the two node plug-ins cannot be repeated to create a relationship. In this way, after connecting the service process relationships that need to be created with lines in the above manner, the submit button is clicked finally. At this time, the electronic device can call respective API interfaces related to the various node plug-ins to save service process relationship information, and a service process is successfully created after the interface is successfully called, the effect is shown in FIG. 30.

It is understandable that during the connection process, the electronic device can further determine whether the two nodes satisfy the following conditions: the channel node is between the initial plug-in set and the processing plug-in set, or between two plug-ins in the processing plug-in set. The connection is allowed only when the conditions are satisfied, otherwise, the connection cannot be completed.

It is understandable that the service process of the data distribution service can be shown in FIG. 3, a transmission channel of the data from the asset to the TIDB database, a transmission channel of the data from the asset to the data storage node or apaache kafka, and a transmission channel of the data from the asset to Zmessage, SDK, asset, mail, short message, etc.

In the embodiment of the present disclosure, a service process of data distribution service can be created. And the node plug-in required by the data distribution service are selected in the workbench for obtaining the service process and moved into the canvas, so as to obtain a plurality of node plug-ins of the service process. Then, the configuration information of the service process is obtained by connecting each of the plug-ins. In this way, in the embodiment, the service process can be created according to the data distribution service. That is, the device data of the data source end can be synchronized to various different receiving ends through the API interfaces according to the configuration information of the service process, and the rule setting can be completed without the user focusing on the specific implementation logic. In addition, in the embodiment, the service separation can be performed on the data source end and the data receiving end, the data receiving thread can be elastically stretched and multi-service processes can be concurrently modified, which is beneficial to fully use the resources of the server and improve the performance of the server for data distribution.

Figure 31:
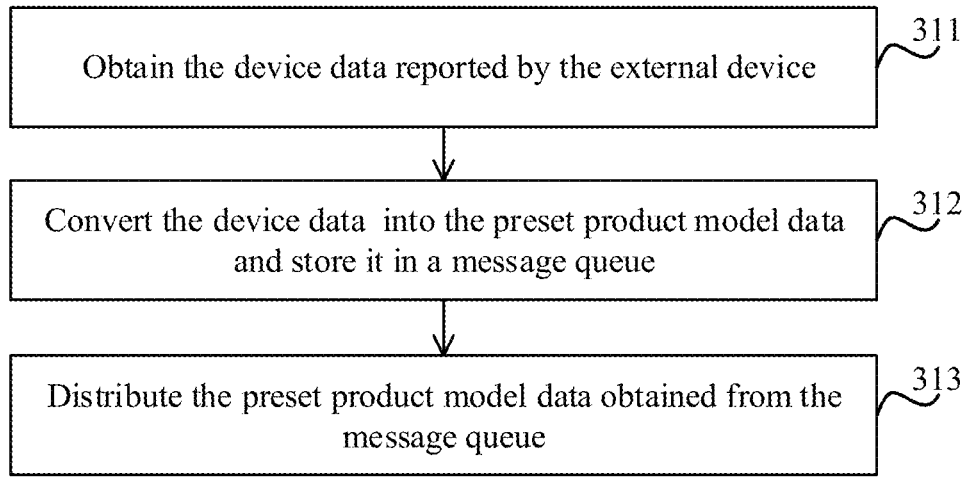
FIG. 31 is a flowchart of a data distribution method according to an exemplary embodiment.

On the basis of the data distribution system shown in FIG. 1, an embodiment of the present disclosure also provides a data distribution method. FIG. 31 is a flowchart of a data distribution method according to an exemplary embodiment. Referring to FIG. 31, the data distribution method includes:

In step 311, the device data reported by the external device is obtained.

In step 312, the device data is converted into the preset product model data and stored in a message queue.

In step 313, the preset product model data obtained from the message queue is distributed.

In an embodiment, the preset product model data includes three types of the device data: a state parameter, a function parameter and a trigger parameter.

In an embodiment, distributing the preset product model data obtained from the second message queue includes:

obtaining initial configuration data, the initial configuration data includes configuration data which represents whether the preset product model data is processed using a preset algorithm;

obtaining a data processing algorithm for the preset product model data if the initial configuration data includes configuration data which represents that the preset product model data is processed using the preset algorithm; the data processing algorithm includes an offline algorithm or a real-time algorithm;

obtaining a processing result by processing the preset product model data based on the offline algorithm or the real-time algorithm; and storing or pushing the processing result.

In an embodiment, distributing the preset product model data obtained from the message queue includes:

pushing the preset product model data to a key value storage system, such that the key value storage system determines whether the preset product model data needs to trigger a rule engine;

in response to need to trigger the rule engine, determining whether a node corresponding to the preset product model data needs to be triggered;

if the trigger is needed, sending a preset type of trigger information to the node; and if the trigger is not needed, sending the preset product model data to the external device.

In an embodiment, distributing the preset product model data obtained from the message queue includes:

storing the preset product model data into a preset database based on a preset strategy, such that an external service system obtains the preset product model data through the preset database.

In an embodiment, obtaining the device data reported by the external device includes:

obtaining a preset data protocol;

if the device data satisfies the preset data protocol, storing the device data into a first message queue; if the device data does not satisfy the data protocol, obtaining device data which satisfies the preset data protocol by performing protocol conversion through SDK and storing the device data in the first message queue.

It can be understood that the method provided by the embodiments of the present disclosure corresponds to the above-mentioned data distribution system, and for the specific contents, reference can be made to the contents of various embodiments of the platform, and details will not be repeated here.

Figure 32:
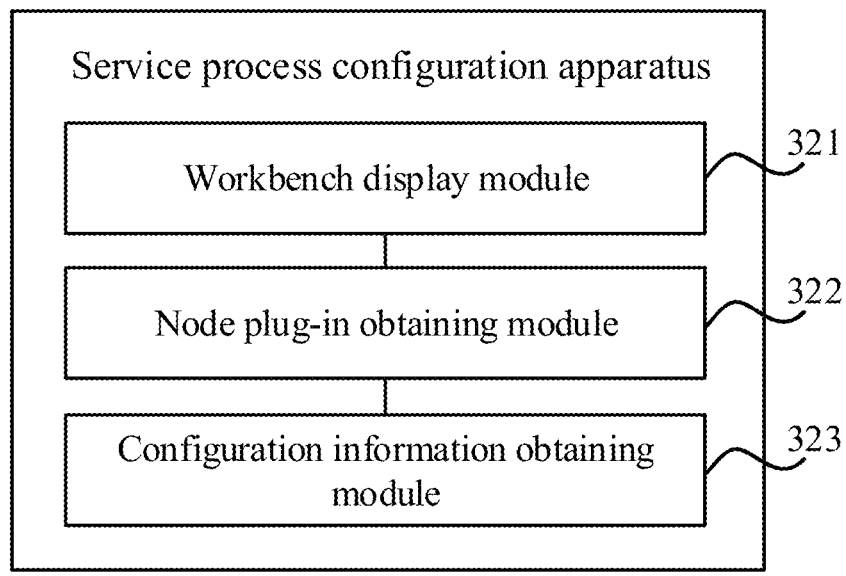
FIG. 32 is a block diagram of a data distribution process configuration device according to an exemplary embodiment.

On the basis of the data distribution process configuration method shown in FIG. 4, an embodiment of the present disclosure also provides a data distribution process configuration apparatus. FIG. 32 is a block diagram of a data distribution process configuration apparatus according to an exemplary embodiment. Referring to FIG. 32, the data distribution process configuration apparatus includes:

a workbench display module 321, configured to display a workbench of the service process in response to detecting a trigger operation that represents creating a service process of a data distribution service; and the workbench includes an area for displaying a node plug-in and an area for displaying a canvas;

a node plug-in obtaining module 322, configured to in response to detecting a trigger operation that represents dragging the node plug-in to the canvas, obtain a plurality of node plug-ins of the service process;

a configuration information obtaining module 323, configured to in response to detecting a trigger operation that represents connecting the node plug-ins, obtain configuration information of the service process, and the configuration information represents a data distribution process from a data source end to a data receiving end.

In an embodiment, a service process creation module is configured to create the service process of the data distribution service;

a node plug-in obtaining module, configured to select the node plug-in required by the data distribution service in the workbench of the service process and move the node plug-in into the canvas, so as to obtain a plurality of node plug-ins of the service process; and the workbench includes an area for displaying the node plug-in and an area for displaying the canvas;

a configuration information obtaining module, configured to obtain the configuration information of the service process by connecting each of the plug-ins, and the configuration information represents a data distribution process from a data source end to a data receiving end.

In an embodiment, the node plug-in of the service process belongs to one of an initial plug-in set, a channel plug-in set and a processing plug-in set; and a plug-in in the channel plug-in set is between a plug-in in the initial plug-in set and a plug-in in the processing plug-in set, or between two plug-ins in the processing plug-in set;

the processing plug-in set includes at least one of a database plug-in set, a filter script plug-in set and an algorithm plug-in set.

In an embodiment, the initial plug-in set includes a data integration plug-in, and the data integration plug-in is a product plug-in mapped to external devices and is used to select a product data source;

the channel plug-in set includes a message queue plug-in set, the message queue plug-in set is used to select a message queue instance of a data source and includes at least one of a MQTT message queue plug-in, a Kafka message queue plug-in and a AMQP message queue plug-in;

the processing plug-in set includes at least one of the database plug-in set, the filter script plug-in set and the algorithm plug-in set;

each plug-in in the database plug-in set is used to select a storage node instance of the data source and information of the storage node instance, and includes at least one of a MYSQL data table plug-in, a TIDB data table plug-in and a HBase data table plug-in;

each plug-in in the filter script plug-in set is used to select a required data item in data, and includes at least one of a JS script plug-in, a jar package plug-in, a python script plug-in or a PHP script plug-in;

each plug-in in the algorithm plug-in set is used to calculate the data, and includes at least one of an offline algorithm plug-in and a real-time algorithm plug-in.

In an embodiment, the node plug-in obtaining module includes:

a node plug-in moving unit, configured to in response to detecting a trigger operation that represents dragging any one of the node plug-ins, move the dragged node plug-in into the canvas; and the dragged node plug-in is a plug-in required by the data distribution service;

a node plug-in saving unit, configured to in response to detecting a trigger operation that represents saving the node plug-in in the canvas, save the node plug-in in the canvas and close the workbench, so as to obtain the node plug-in of the service process.

In an embodiment, the node plug-in moving unit includes:

an unconfigured plug-in generating subunit, configured to generate a unconfigured plug-in corresponding to the dragged node plug-in in the canvas;

an input information obtaining subunit, configured to in response to detecting a trigger operation that represents editing the unconfigured plug-in, obtain input information corresponding to each information item in a tab page through the tab page of the unconfigured plug-in;

an input information saving subunit, configured to in response to detecting a trigger operation that represents saving the input information of each information item, save the input information of each information item and close the tab page of each information item, so as to obtain the node plug-in of the service process.

In an embodiment, the configuration information obtaining module includes:

a node plug-in connection unit, configured to in response to detecting a trigger operation that represents connecting two node plug-ins, connect the two node plug-ins with a logic relationship;

a service process obtaining unit, configured to in response to detecting a trigger operation that represents submitting node plug-in relationship, call respective API interfaces corresponding to the node plug-ins, so as to obtain the configuration information of the service process.

In an embodiment, the apparatus further includes a space matching creation module including:

a first pop-up box display unit, configured to display a first pop-up box in a display area in response to detecting a trigger operation that represents creating a workspace; and the first pop-up box includes at least one item of contents of a workspace name, an alias, a logo picture and a space description;

an input data obtaining unit, configured to in response to detecting a trigger operation that represents inputting any item of content, obtain input data for the item of content;

a space area obtaining unit, configured to save the input data and close the pop-up box in response to detecting a trigger operation that represents saving the input data, so as to obtain the workspace area.

In an embodiment, the service process creation module includes:

an editing page display unit, configured to display an edit area page of a workspace area in a display area in response to detecting a trigger operation that represents editing the workspace area; and the edit area page includes a new creation service process button;

a process pop-up display unit, configured to display a new creation process pop-up box in response to detecting a trigger operation that represents selecting the new creation service process button; and the new creation process pop-up box includes a process name and a process description;

an input data obtaining unit, configured to obtain input data of the process name or the process description of the data distribution service in response to detecting a trigger operation that represents filling in the process name or the process description;

an input data saving unit, configured to save the input data and close the pop-up box in response to detecting a trigger operation that represents saving the input data, so as to obtain the service process of the data distribution service in the workspace area.

It can be understood that the apparatus provided by the embodiment of the present disclosure corresponds to the method shown in FIG. 4, and the specific contents can refer to the content of each embodiment of the method, which will not be repeated here.

In an exemplary embodiment, an electronic device is also provided, including:

at least one processor;

at least one memory storing a computer program executable by the processor;

the at least one processor is configured to execute the computer program in the at least one memory to implement the steps of the above method.

In an exemplary embodiment, a computer-readable storage medium including an executable computer program is provided, for example, a memory including instructions, and the executable computer program can be executed by a processor to implement the steps of the method as shown in FIG. 1. The readable storage medium can be a ROM, a random access memory (RAM), a CD-ROM, a magnetic tape, a floppy disk and an optical data storage device.

Other embodiments of the present disclosure will readily occur to those skilled in the art upon consideration of the specification and practice of the present disclosure disclosed herein. The present disclosure is intended to cover any variations, uses or adaptive modifications that follow the general principles of the present disclosure and include common general knowledge or customary technical means in the art not disclosed by the present disclosure. The specification and embodiments are to be regarded as exemplary only, with the true scope and spirit of the present disclosure being indicated by the following claims.

It should be understood that the present disclosure is not limited to the precise structures already described above and shown in the drawings, and that various modifications and changes may be made without departing from the scope thereof. The scope of the present disclosure is limited only by the appended claims.

In the present disclosure, the machine-readable storage medium can be any electronic, magnetic, optical or other physical storage.

The device can include or store information such as executable instructions, data, etc. For example, the machine-readable storage medium can be a RAM (Radom Access Memory), a volatile memory, a non-volatile memory, a flash memory, a storage drive (such as a hard disk drive), a solid state disk, any type of storage disk (such as an optical disk, dvd, etc.), or similar storage media, or a combination thereof.

The apparatus, module or unit set forth in the above embodiments can be specifically implemented by a computer chip or an entity, or can be implemented by a product having a certain function.

A typical implementation device is a computer, and a specific form of the computer can be a personal computer, a laptop computer, a cellular phone, a camera phone, a smart phone, a personal digital assistant, a media player, a navigation device, an e-mail transceiver device, a game console, a tablet computer, a wearable device, or a combination of any of these devices.

For convenience of description, when the above apparatus is described, the functions are divided into various units and described respectively. Of course, when implementing the present disclosure, the functions of the units can be implemented in one or more software and/or hardware.

It will be understood by those skilled in the art that embodiments of the present disclosure can be provided as a method, or a computer program product. Therefore, the present disclosure can take the form of an entirely hardware embodiment, an entirely software embodiment, or an embodiment combining software and hardware aspects. Moreover, embodiments of the present disclosure can take the form of a computer program product embodied on one or more computer usable storage media (including but not limited to disk memory, CD-ROM, optical memory, etc.) having computer usable program code embodied therein.

The present disclosure is described with reference to a flowchart and/or block diagram of a method, apparatus (system), and computer program product according to embodiments of the present application.

It should be understood that each process and/or block in the flowcharts and/or block diagrams, as well as combinations of processes and/or blocks in the flowcharts and/or block diagrams, can be implemented by computer program instructions. These computer program instructions can be provided to a processor of a general purpose computer, a special purpose computer, an embedded processing machine or other programmable data processing apparatus to produce a machine, such that instructions executed by a processor of a computer or other programmable data processing apparatus generate apparatuses for implementing the functions specified in one or more processes of the flowchart and/or one or more blocks of a block diagram.

Moreover, the computer program instructions can also be stored in a computer readable memory capable of guiding the computer or the other programmable data processing apparatus to work in a specific manner, such that the instructions stored in the computer readable memory produce an article of manufacture including an instruction apparatus. The instruction apparatus implements the functions specified in one or more processes of the flowchart and/or one or more blocks of a block diagram.

The computer program instructions can also be loaded onto a computer or other programmable data processing apparatus, such that a series of operational steps are performed on the computer or the other programmable apparatus to produce a computer-implemented process. Thus, the instructions executed on the computer or other programmable apparatus provide steps for implementing the functions specified in one or more processes of the flowchart and/or one or more blocks of a block diagram.

The above descriptions are only preferred embodiments of the present disclosure, and are not intended to limit the present disclosure.

Any modifications, equivalent replacements, improvements, etc. made within the spirit and principle of the present disclosure shall be included in the scope of protection of the present application.

The invention claimed is:

1. A data distribution system, comprising a channel configuration module, a data engine module, a data processing module, a rule engine module, a preset database and an external interface module;

the channel configuration module is connected with an external device, and is configured to convert obtained device data of the external device into preset product model data and store the preset product model data in a message queue;

the data engine module is connected with the channel configuration module, and is configured to distribute the preset product model data obtained from the message queue to the preset database or the data engine module, or generate and send a control instruction to the data processing module and the rule engine module;

the data processing module is configured to process the preset product model data using a preset offline algorithm or a real-time algorithm in response to the control instruction, and push a processing result or store the processing result in real time;

the rule engine module is configured to determine whether a node corresponding to the preset product model data needs to be triggered in response to the control instruction; if the trigger is needed, send a preset type of trigger information to the node; if the trigger is not needed, send the preset product model data to the external device;

the external interface module is configured to feed back the preset product model data from the preset database in response to a call request of an external service system.

2. A data distribution system, comprising a channel configuration module and a data engine module, wherein, the channel configuration module is connected with an external device, and is configured to convert obtained device data of the external device into preset product model data and store the preset product model data in a message queue;

the data engine module is connected with the channel configuration module, and is configured to distribute the preset product model data obtained from the message queue;

the data distribution system further comprises a rule engine module, the rule engine module is connected with the data engine module;

the data engine module is further configured to generate and sent a control instruction to the rule engine module when the preset product model data needs to trigger the rule engine;

the rule engine module is configured to determine whether a node corresponding to the preset product model data needs to be triggered in response to the control instruction; if the trigger is needed, send a preset type of trigger information to the node; if the trigger is not needed, send the preset product model data to the external device.

3. The data distribution system according to claim 2, wherein the preset product model data comprises three types of device data: a state parameter, a function parameter and a trigger parameter.

4. The data distribution system according to claim 2, further comprising a data processing module, the data processing module is connected with the data engine module;
the data engine module is further configured to generate a control instruction according to initial configuration data, and send the control instruction to the data processing module;
the data processing module is configured to process the preset product model data using a preset offline algorithm or a real-time algorithm in response to the control instruction, and push a processing result or store the processing result in real time.

5. The data distribution system according to claim 2, wherein the data engine module is further configured to push the preset product model data to a preset cache, such that the cache determines whether the node corresponding to the preset product model data needs to be triggered.

6. The data distribution system according to claim 2, further comprising an external interface module, the external interface module is connected with the data engine module;
the data engine module is further configured to store the preset product model data into a preset database;
the external interface module is configured to feed back the preset product model data from the preset database in response to a call request of an external service system.

7. A data distribution method being applicable to the data distribution system according to claim 2, the method comprising:
obtaining device data reported by the external device;
converting the device data into the preset product model data and storing the preset product model data in a message queue; and
distributing the preset product model data obtained from the message queue;
wherein distributing the preset product model data obtained from the message queue comprises:
pushing the preset product model data to a cache, such that the cache determines whether the preset product model data needs to trigger a rule engine;
in response to need to trigger the rule engine, determining whether a node corresponding to the preset product model data needs to be triggered;
if the trigger is needed, sending a preset type of trigger information to the node; and if the trigger is not needed, sending the preset product model data to the external device.

8. The data distribution method according to claim 7, wherein the preset product model data comprises three types of device data: a state parameter, a function parameter and a trigger parameter.

9. The data distribution method according to claim 7, wherein obtaining the device data reported by the external device comprises:
obtaining a preset data protocol;
if the device data satisfies the preset data protocol, storing the device data into a first message queue;
if the device data does not satisfy the preset data protocol, obtaining device data which satisfies the preset data protocol by performing protocol conversion through SDK and storing the device data in the first message queue.

10. An electronic device, comprising:
at least one processor;
at least one memory storing a computer program executable by the processor;
wherein the at least one processor is configured to execute the computer program in the at least one memory to implement operations comprising:
obtaining device data reported by an external device;
converting the device data into preset product model data and storing the preset product model data in a message queue; and
distributing the preset product model data obtained from the message queue;
wherein distributing the preset product model data obtained from the message queue comprises:
pushing the preset product model data to a cache, such that the cache determines whether the preset product model data needs to trigger a rule engine;
in response to need to trigger the rule engine, determining whether a node corresponding to the preset product model data needs to be triggered;
if the trigger is needed, sending a preset type of trigger information to the node; and if the trigger is not needed, sending the preset product model data to the external device.

11. The electronic device according to claim 10, wherein the preset product model data comprises three types of device data: a state parameter, a function parameter and a trigger parameter.

12. The electronic device according to claim 10, wherein the operations comprise:
obtaining a preset data protocol;
if the device data satisfies the preset data protocol, storing the device data into a first message queue;
if the device data does not satisfy the preset data protocol, obtaining device data which satisfies the preset data protocol by performing protocol conversion through SDK and storing the device data in the first message queue.

13. A non-transitory computer-readable storage medium, wherein an executable computer program in the storage medium is executed by a processor to implement the method according to claim 7.

* * * * *